United States Patent
Matsuoka

(10) Patent No.: US 11,299,010 B2
(45) Date of Patent: Apr. 12, 2022

(54) ALERTNESS MAINTENANCE APPARATUS

(71) Applicant: DENSO CORPORATION, Kariya (JP)

(72) Inventor: Takashi Matsuoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 16/751,650

(22) Filed: Jan. 24, 2020

(65) Prior Publication Data

US 2020/0156440 A1  May 21, 2020

Related U.S. Application Data

(63) Continuation of application No. PCT/JP2018/025837, filed on Jul. 9, 2018.

(30) Foreign Application Priority Data

Aug. 2, 2017 (JP) .............................. JP2017-150091
May 16, 2018 (JP) .............................. JP2018-094607

(51) Int. Cl.
 *B60H 1/00* (2006.01)
 *G06K 9/00* (2022.01)
 *F24F 11/80* (2018.01)
 *F24F 120/14* (2018.01)

(52) U.S. Cl.
 CPC ..... *B60H 1/00742* (2013.01); *B60H 1/00285* (2013.01); *F24F 11/80* (2018.01); *G06K 9/00845* (2013.01); *F24F 2120/14* (2018.01)

(58) Field of Classification Search
 CPC ............ B60H 1/00742; B60H 1/00285; B60H 1/00878; F24F 11/80; F24F 2120/14; G06K 9/00845; B60K 35/00; B60K 2370/178
 See application file for complete search history.

(56) References Cited

U.S. PATENT DOCUMENTS

2009/0312998 A1 * 12/2009 Berckmans ............ G16H 50/50 703/11

FOREIGN PATENT DOCUMENTS

| JP | 56-002228 A | | 1/1981 |
|---|---|---|---|
| JP | 56002228 A | * | 1/1981 |
| JP | 5-155232 A | | 6/1993 |
| JP | 5-169962 A | | 7/1993 |
| JP | 11-310053 A | | 4/1998 |
| JP | 2009-022370 A | | 2/2009 |
| JP | 2009022370 A | * | 2/2009 |
| JP | 5155232 B2 | * | 3/2013 |
| JP | 5601043 B2 | * | 10/2014 |
| JP | 5601043 B2 | | 10/2014 |
| JP | 2017-228280 A | | 12/2017 |
| JP | 2017228280 A | * | 12/2017 |

* cited by examiner

Primary Examiner — Emmanuel E Duke
(74) Attorney, Agent, or Firm — Maschoff Brennan

(57) ABSTRACT

An alertness maintenance apparatus includes a stimulation controller that is configured to cause a stimulation device to generate multiple types of temperature stimuli maintaining an alert state of a subject person, the temperature stimuli including a temperature stimulus to a hand of the subject person and also including a temperature stimulus to a face of the subject person or a temperature stimulus to a torso of the subject person via a seat on which the subject person sits.

16 Claims, 14 Drawing Sheets

ALERTNESS MAINTENANCE APPARATUS

CROSS REFERENCE TO RELATED APPLICATION

The present application is a continuation application of International Patent Application No. PCT/JP2018/025837 filed on Jul. 9, 2018, which designated the U.S. and claims the benefit of priority from Japanese Patent Application No. 2017-150091 filed on Aug. 2, 2017, and Japanese Patent Application No. 2018-094607 filed on May 16, 2018. The entire disclosures of all of the above applications are incorporated herein by reference.

TECHNICAL FIELD

The present disclosure relates to an alertness maintenance apparatus for maintaining an alert state of a subject person.

BACKGROUND

It has been known that a technique maintains an alert state of a driver by giving a stimulus to the driver.

SUMMARY

The present disclosure describes an alertness maintenance apparatus includes a stimulation controller that is configured to cause a stimulation device to generate multiple types of temperature stimuli maintaining an alert state of a subject person, the temperature stimuli including a temperature stimulus to a hand of the subject person and also including a temperature stimulus to a face of the subject person or a temperature stimulus to a torso of the subject person via a seat on which the subject person sits.

BRIEF DESCRIPTION OF DRAWINGS

Objects, features, and advantages of the present disclosure will become more apparent from the following detailed description with reference to the accompanying drawings. In the drawings.

DETAILED DESCRIPTION

Figure 1:
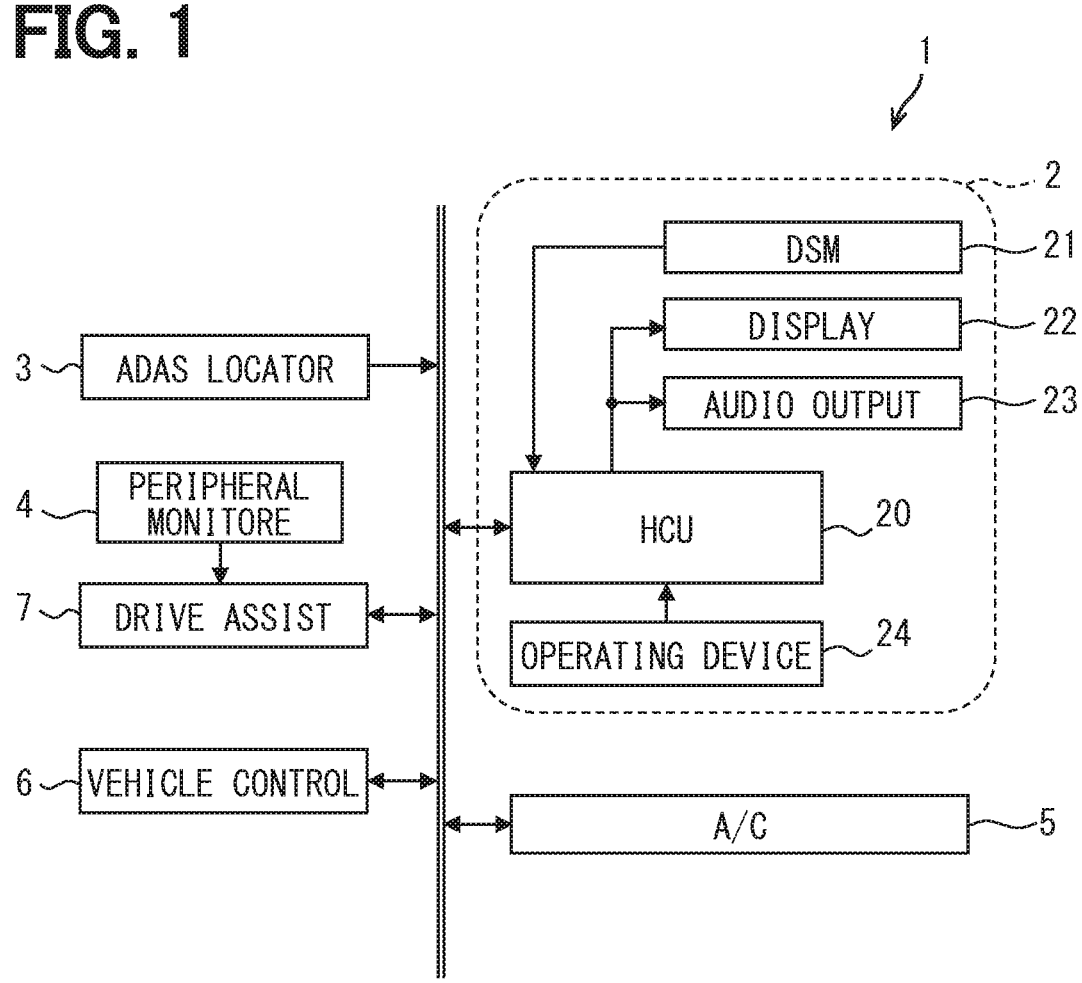
FIG. 1 is a diagram illustrating one example of a schematic configuration of a drive assist system.

Techniques for maintaining an alert state of a driver by giving a stimulus to the driver have been known. A related art discloses a technique for giving a temperature stimulus alternately to the left and right hands and the neck of the driver by blowing air from the left and right vents of an air conditioning system.

While a temperature stimulus is given alternately to the hands and neck of the driver according to the technique disclosed in a related art, it is possible that the alerting effect cannot be achieved sufficiently since the neck may be unnecessarily highly sensitive from the perspective of the cutaneous sense.

The present disclosure describes an alertness maintenance apparatus that enables a higher alerting effect to be achieved.

According to one aspect of the present disclosure, an alertness maintenance apparatus may comprise a stimulation controller that is configured to cause a stimulation device to generate multiple types of temperature stimuli maintaining an alert state of a subject person, the temperature stimuli including a temperature stimulus to a hand of the subject person and also including a temperature stimulus to a face of the subject person or a temperature stimulus to a torso of the subject person via a seat on which the subject person sits. The stimulation controller includes a rotation controller that is configured to change intensities of the multiple types of temperature stimuli generated to sequentially increase the intensities of the temperature stimuli in rotation.

According to the configuration, a higher alerting effect can be obtained because the temperature stimuli for maintaining an alert state of the subject person are given not only to the hands of the subject person but also to the face or torso, which are body parts with a particularly high sensitivity to a temperature stimulus. Moreover, since the intensities of multiple types of temperature stimuli generated by the stimulation device are changed such as to be sequentially increased, the subject person hardly becomes habituated to each stimulus, and is very unlikely to become habituated to the stimuli. Therefore, a higher alerting effect can be achieved in this respect.

Several embodiments for disclosure will be described with reference to the drawings. For convenience of explanation, parts having the same functions as the parts illustrated in the drawings used for foregoing descriptions in various embodiments may be given the same reference numerals and not described again. The descriptions of other embodiments may be referred to with respect to these parts given the same reference numerals.

First Embodiment (Overview of the Configuration of the Drive Assist System)

The present embodiment will be described with reference to the drawings. The drive assist system 1 shown in FIG. 1 is used in an automobile (or simply referred to as a vehicle), and includes an HMI (Human Machine Interface) system 2, an ADAS (Advanced Driver Assistance Systems) locator 3, a peripheral monitoring sensor 4, an air conditioner 5, a vehicle control ECU 6, and a drive assist ECU 7. It is to be assumed that the HMI system 2, ADAS locator 3, peripheral monitoring sensor 4, air conditioner 5, vehicle control ECU 6, and drive assist ECU 7 are connected to an in-vehicle LAN, for example. The vehicle in which the drive assist system 1 is installed will be referred to as a subject vehicle.

The ADAS locator 3 includes a GNSS (Global Navigation Satellite System) receiver, an inertial sensor, and a map database (also referred to as a DB) in which map data is stored. The GNSS receiver receives positioning signals from a plurality of artificial satellites. The inertial sensor includes a gyro sensor and an acceleration sensor, for example. The map DB is a non-volatile memory, and stores therein map data such as link data, node data, road shapes, and the like. The map data may be configured to include a three-dimensional map including road shapes and features of structures represented by dots.

The ADAS locator 3 sequentially determines the position of the subject vehicle in which the ADAS locator 3 is installed by combining the positioning signals received by the GNSS receiver and the measurement results of the inertial sensor. In an alternative configuration, the positioning of the vehicle may also be achieved by using traveling distances or the like determined from pulse signals sequentially output from wheel speed sensors mounted on the subject vehicle. The determined vehicle position is output to the in-vehicle LAN. The ADAS locator 3 also reads out the map data from the map DB and outputs the data to the in-vehicle LAN. In an alternative configuration, the map data may also be acquired from an external server via an in-vehicle communication module, for example.

The peripheral monitoring sensor 4 detects obstacles around the subject vehicle such as moving objects including pedestrians and other vehicles, and stationary objects such as fallen objects on the road. The peripheral monitoring sensor 4 also detects road surface markings such as traffic lane markings around the subject vehicle. Examples of the peripheral monitoring sensor 4 include a peripheral monitoring camera that captures images of a predetermined range around the subject vehicle, and a sensor such as a milliwave radar, sonar, LIDAR (Light Detection and Ranging/Laser Imaging Detection and Ranging), and the like that transmits waves to explore the predetermined range around the subject vehicle. The peripheral monitoring camera sequentially outputs the sequentially captured images as sensor-detected information to the drive assist ECU 7. The sensor that transmits exploring waves such as a sonar, milliwave radar, LIDAR, and the like sequentially outputs scanning results based on received signals that are obtained when waves reflected by an obstacle are received, as sensor-detected information to the drive assist ECU 7.

Figure 2:
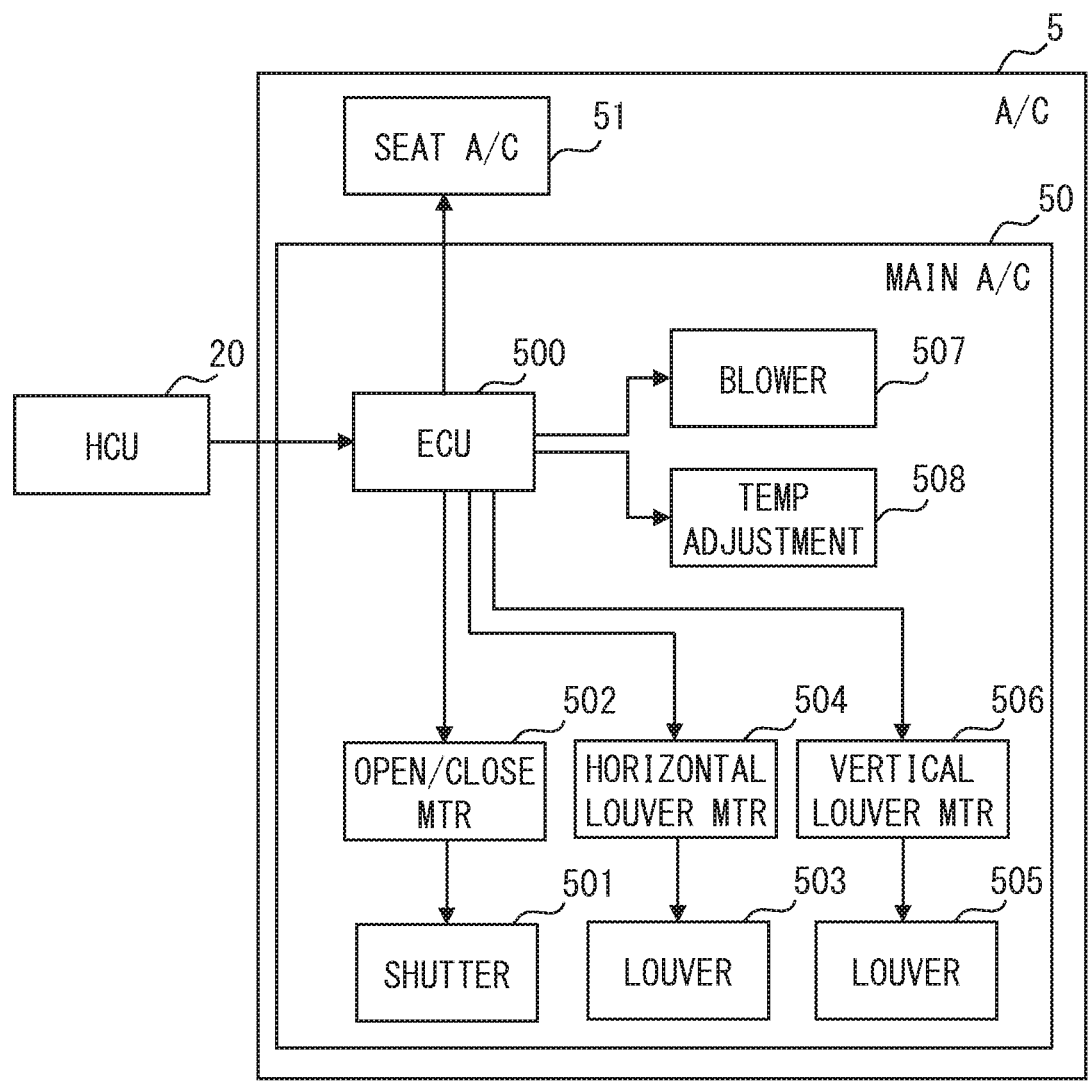
FIG. 2 is a diagram illustrating one example of a schematic configuration of an air conditioner.

The air conditioner 5 includes a main air conditioner 50 and a seat air conditioner 51 as shown in FIG. 2. The main air conditioner 50 includes an air conditioning ECU 500, a shutter 501, an open/close motor 502, a horizontal louver 503, a horizontal louver motor 504, a vertical louver 505, a vertical louver motor 506, a blower 507, and a temperature adjustment part 508.

The shutter 501 is a movable shutter disposed upstream of a vent in a flow passage of air for closing the flow passage of air. The open/close motor 502 is a motor for driving the shutter 501.

The horizontal louver 503 is provided near the vent and upstream of the vent in the flow passage of air. The horizontal louver 503 includes multiple long plates formed to extend along a vehicle width direction of the subject vehicle. These multiple long plates are spaced apart from each other and aligned along the height direction of the subject vehicle. Each of the long plates of the horizontal louver 503 is disposed rotatably around a shaft extending along the vehicle width direction. The horizontal louver motor 504 is a motor for driving the shafts of the long plates of the horizontal louver 503 and made up of a plurality of motors, for example, so that the respective shafts of the long plates can be driven separately.

The vertical louver 505 is also provided near the vent and upstream of the vent in the flow passage of air. The vertical louver 505 includes multiple long plates formed to extend along the height direction of the subject vehicle. These multiple long plates are spaced apart from each other and aligned along the vehicle width direction. Each of the long plates of the vertical louver 505 is disposed rotatably around a shaft extending along the height direction of the subject vehicle. The vertical louver motor 506 is a motor for driving the shafts of the long plates of the vertical louver 505 and made up of a plurality of motors, for example, so that the respective shafts of the long plates can be driven separately.

The orientation of the horizontal louver 503 is controlled by the horizontal louver motor 504 so that the direction of air blown out from the vent downstream of this horizontal louver 503 is adjusted in the up and down direction. The orientation of the vertical louver 505 is controlled by the vertical louver motor 506 so that the direction of air blown out from the vent downstream of this vertical louver 505 is adjusted in the left and right direction.

The long plates of the vertical louver 505 are rotated by the vertical louver motor 506 such that the spacing between the adjacent long plates is reduced toward the blow-out direction, and the long plates of the horizontal louver 503 are rotated by the horizontal louver motor 504 such that the spacing between the adjacent long plates is reduced toward the blow-out direction, whereby the range of the expelled air can be adjusted to concentrate the air flow. Alternatively, the long plates are rotated such that the spacing between the adjacent long plates of the vertical louver 505 and the spacing between the adjacent long plates of the horizontal louver 503 are increased toward the blow-out direction, whereby the range of the expelled air can be adjusted to disperse the air flow.

The blower 507 adjusts the amount of air blown out from the vent. The temperature adjustment part 508 includes a heat exchanger and adjusts the temperature of the air blown out from the vent.

The air conditioning ECU 500 is configured by a microcomputer as a main body that includes a processor, a memory, an I/O, and buses connecting these, and performs various processes by executing control programs stored in the memory. The memory referred to herein is a non-transitory tangible storage medium that stores computer-readable programs and data in a non-transitory manner. The non-transitory tangible storage medium is realized by a semiconductor memory, a magnetic disc, or the like. The air conditioning ECU 500 acquires air conditioning request information output from the HCU 20, and executes adjustments of air direction, air amount, concentration and dispersal of air, air temperatures, and the like, based on the acquired air conditioning request information.

The seat air conditioner 51 is disposed inside the driver's seat and performs air conditioning to the torso of the driver seated in the driver's seat through the driver's seat. The seat air conditioner 51 is also controlled by the air conditioning ECU 500. The method of air conditioning performed by the seat air conditioner 51 may be, for example, providing a duct inside the driver's seat, and cooling or heating the seat by supplying cold air or hot air into the duct. Other methods include, for example, providing a suction port inside the driver's seat for sucking in the air inside the vehicle from this suction port to cool the seat.

The vehicle control ECU 6 is an electronic control apparatus that performs acceleration/deceleration control and/or steering control of the subject vehicle. Examples of vehicle control ECU 6 include a steering ECU that performs steering control, a power unit control ECU that performs acceleration/deceleration control, a brake ECU, and the like. The vehicle control ECU 6 acquires detection signals output from various sensors installed in the subject vehicle such as an accelerator position sensor, a braking pressure sensor, a steering angle sensor, a wheel speed sensor, and the like, and outputs control signals to various travel control devices such as an electronically controlled throttle, a brake actuator, an EPS (Electric Power Steering) motor, and the like.

The vehicle control ECU 6 is able to output the detection signals of the sensors noted above to the in-vehicle LAN.

The drive assist ECU 7 recognizes the traveling environment of the subject vehicle from the position of the subject vehicle obtained by the ADAS locator 3, map data, sensor-detected information acquired by the peripheral monitoring sensor 4, and the like. The drive assist ECU 7 provides driver assistance of the subject vehicle by performing the acceleration/deceleration control and/or steering control of the subject vehicle in cooperation with the vehicle control ECU 6 based on the recognized peripheral environment. Examples of driver assistance include an assist to keep the subject vehicle travelling within the lane of the subject vehicle, an assist for the subject vehicle to travel at constant speed, an assist to automatically slow down to avoid an obstacle, and the like. In a possible configuration, the driver assistance may provide automated driving by the vehicle control ECU 6 automatically performing the acceleration, braking, and steering of the subject vehicle. In the present embodiment, it may be preferable that the automated driving, if performed, can be switched to manual driving when the planned traveling of the automated driving zone has terminated, or depending on the recognized peripheral environment or failures or the like of the sensing operation by the peripheral monitoring sensor 4.

The HMI system 2 includes an HCU (Human Machine Interface Control Unit) 20, a DSM (Driver Status Monitor) 21, a display device 22, an audio output device 23, and an operating device 24. The HMI system 2 receives input operations from the driver, presents information to the driver, and monitors the status of the driver. This driver corresponds to a subject person.

The DSM 21 is configured by a near infrared light source, a near infrared camera, a control unit that controls these, and the like. The DSM 21 is disposed on the upper face of an instrument panel, for example, with the near infrared camera oriented toward the driver's seat of the subject vehicle. The DSM 21 takes pictures of the head part of the driver irradiated with near infrared light by the near infrared light source with the near infrared camera. The images captured by the near infrared camera are analyzed by the control unit. The control unit detects the direction of the face and/or direction of the gaze of the driver, for example, from the captured images.

The DSM 21 extracts data such as the degree of opening of the driver's eyes from the captured images and detects the alertness level (i.e., drowsiness) of the driver. The term alertness may be referred to as arousal, awareness, etc. The DSM 21 corresponds to a drowsiness detection device. One example will be described in the present embodiment where the alertness level detected by the DSM 21 is classified into six, from 0 to 5, drowsiness levels. The six drowsiness levels of classification are, sequentially from the highest level of alertness, "drowsiness level 0" when the driver does not seem drowsy at all (in other words, alert state), "drowsiness level 1" when the driver seems slightly drowsy, "drowsiness level 2" when the driver seems drowsy, "drowsiness level 3" when the driver seems substantially drowsy, "drowsiness level 4" when the driver seems very drowsy, and "drowsiness level 5" when the driver seems asleep (in other words, sleeping). The DSM 21 outputs the detected drowsiness to the HCU 20.

Examples of the display device 22 include a combination meter, a CID (Center Information Display), a HUD (Head-Up Display), an LED, a display of a navigation device, and the like. The combination meter is disposed in front of the driver's seat. The CID is disposed above a center cluster in the vehicle interior. The combination meter displays various images for presenting information based on the image data obtained from the HCU 20 on the display screen of a liquid crystal display. The HUD projects the image light based on the image data obtained from the HCU 20 to a projection area defined on the windshield. The image light reflected by the windshield toward the vehicle interior is perceived by the driver seated in the driver's seat. The driver can see a virtual image projected by the HUD overlapped on the outside view in front of the subject vehicle. The LED is provided in the instrument panel, at the foot of the driver's seat, and the like, and the light emitted from the LED is controlled by the HCU 20. Examples of the audio output device 23 include an audio speaker that outputs a voice, a buzzer that outputs a sound, and the like.

The operating device 24 is a set of switches operated by the driver. The operating device 24 includes, for example, a steering switch provided to a spoke portion of the subject vehicle's steering, a touch switch integral with the display device 22 having a display, and the like. The present embodiment will be described hereinafter assuming that the operating device 24 includes a switch for the driver to request generation of a stimulus (also referred to as a stimulus request switch) for maintaining alertness (also referred to as an alerting stimulus).

The HCU 20 is configured by a microcomputer as a main body that includes a processor, a memory, an I/O, and buses connecting these, and performs various processes by executing control programs stored in the memory. Execution of this control program by a processor corresponds to execution of a method corresponding to the control program. The memory referred to herein is a non-transitory tangible storage medium that stores computer-readable programs and data in a non-transitory manner. The non-transitory tangible storage medium is realized by a semiconductor memory, a magnetic disc, or the like. The HCU 20 corresponds to the alertness maintenance apparatus. The processes performed by the HCU 20 will be described later in more detail.

(Overview of the Configuration of HCU)

Figure 3:
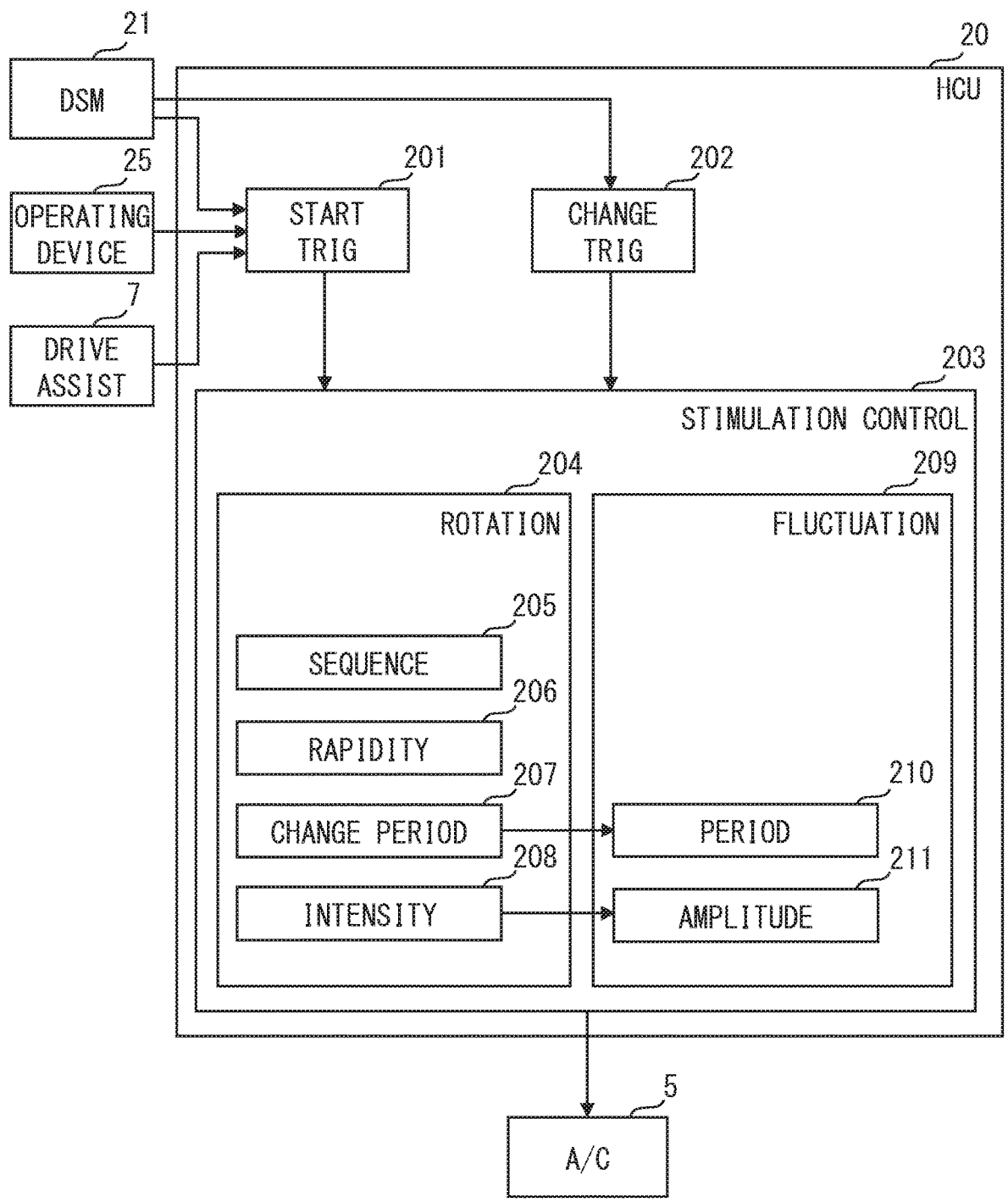
FIG. 3 is a diagram illustrating one example of a schematic configuration of an HCU.

An overview of the configuration of the HCU 20 will be described with reference to FIG. 3. The HCU 20 includes a start trigger detector 201, a change trigger detector 202, and a stimulation controller 203. The stimulation controller 203 includes a rotation controller 204 and a fluctuation controller 209. The rotation controller 204 includes a sequence controller 205, a rapidity controller 206, a change period controller 207, and an intensity controller 208. The fluctuation controller 209 includes a fluctuation period controller 210 and a fluctuation amplitude controller 211. Some or all of the functions performed by the HCU 20 may be configured by hardware using one or a plurality of ICs or the like. Some or all of the functional blocks of the HCU 20 may be realized by a combination of processor-executed software and hardware components.

The start trigger detector 201 detects a trigger for generating an alerting stimulus (also referred to as a start trigger). For example, a drowsiness level of a threshold or more detected by the DSM 21 is detected by the start trigger detector 201 as a start trigger. The threshold herein refers to a level of drowsiness that requires alerting for the driver to perform a driving operation and may for example be "drowsiness level 2".

An operation performed on the stimulus request switch in the operating device 24 is also detected by the start trigger detector 201 as a start trigger. The stimulus request switch may be operated by the driver whenever the driver wishes to generate an alerting stimulus. In an alternative configuration, the start trigger detector 201 may monitor the drive assist ECU 7 and a change of the automation level of the automated driving from a level in which the driver need not be watchful to a level in which the driver must be watchful may be detected as a start trigger.

In situations where an alerting stimulus is being generated by the stimulation controller 203 to be described later, the drowsiness detected by the DSM 21 reaching or exceeding a threshold is detected by the change trigger detector 202 as a trigger for changing the mode of generating the alerting stimulus (also referred to as a change trigger). This change trigger detector 202 corresponds to a trigger detector. The threshold referred to here may be the same as the one used as a condition for detecting the start trigger, or different. In the present embodiment, both thresholds are the same. The change trigger detector 202 should preferably start the detection after a certain period of time of several minutes, for example, after the stimulation controller 203 starts generating the alerting stimulus, so that the change trigger can be detected after the stimulation controller 203 starts generating the alerting stimulus and the drowsiness of the driver lessens.

In an alternative configuration, the change trigger detector 202 may count the time that passes after the stimulation controller 203 starts generating an alerting stimulus with a timer circuit or the like, and detect this elapsed time reaching a prescribed time as the change trigger. The prescribed time referred to here means the time that can be set as suited such as several tens minutes. For example, the time estimated for habituation to occur with respect to the mode of the alerting stimulus that has been generated by the stimulation controller 203 so far may be set.

When the start trigger detector 201 detects the start trigger, the stimulation controller 203 causes multiple types of alerting stimuli to be generated at the same time from a stimulation device that produces alerting stimuli. The air conditioner 5 is used as the stimulation device. The stimulation controller 203 controls the operation by outputting air conditioning request information to the air conditioning ECU 500 of the air conditioner 5. The alerting stimulus generated by the air conditioner 5 is a temperature stimulus such as cold air, for example. The temperature stimulus may be hot air, as long as it provides an alerting effect.

Different types of temperature stimuli are provided when the target regions of temperature stimuli are different parts of a human body. In the present embodiment, the air conditioner 5 generates multiple types of alerting stimuli such as a temperature stimulus targeting the face, a temperature stimulus targeting the hands, and a temperature stimulus targeting the torso. The temperature stimulus targeting the face may be, more specifically, a temperature stimulus targeting cheeks. Both configurations are possible where a temperature stimulus targeting only one hand is provided, or a temperature stimulus targeting both hands is provided. When both hands are the target, in a possible configuration, the temperature stimulus targeting the left hand and the temperature stimulus targeting the right hand may be treated as different types of temperature stimuli. In the present embodiment, one example will be described where the temperature stimulus targeting the left hand and the temperature stimulus targeting the right hand are treated as the same type of temperature stimulus. The temperature stimulus targeting the torso may be rephrased as a temperature stimulus targeting a body trunk.

In a possible configuration for the face and hands, for example, dedicated vents that direct air to each of the face, left hand, and right hand may be provided in the vehicle, and the amount and temperature of the cold air from each vent may be adjusted by the main air conditioner 50 of the air conditioner 5, to adjust the temperature stimulus targeting the face and the temperature stimulus targeting the hands. In a possible configuration for the torso, the temperature stimulus targeting the torso may be adjusted by controlling the amount and temperature of the cold air that cools the driver's seat by the seat air conditioner 51 of the air conditioner 5.

The configuration for the face and hands is not limited to the one having dedicated vents that direct air to each of the face, left hand, and right hand in the vehicle. In an alternative configuration, for example, the long plates of each of the horizontal louver 503 and vertical louver 505 provided to one vent may be separately rotated so that air is blown from one vent toward multiple target regions.

The stimulation controller 203 includes the rotation controller 204 and fluctuation controller 209 as mentioned above, and causes the rotation controller 204 to change the intensities of temperature stimuli generated by the air conditioner 5 such that the intensities of the temperature stimuli for the multiple target regions are increased one after another (i.e., in rotation). In a configuration where cold air is used as the temperature stimulus, the presence/absence of air, amount of air, temperature of air, and the like, may be varied to change the intensity of the temperature stimulus. The intensities may be changed in rotation, for example, by sequentially changing the direction of the cold air so that the target region of the cold air is altered in turn with respect to the face and hands, while starting and stopping the cooling of the driver's seat with the cold air from the seat air conditioner 51 with respect to the torso. In a configuration where a plurality of target regions are stimulated simultaneously, the intensities may be changed in rotation by making adjustments such that the amount of air is increased in turn from one target region to another, or by making adjustments such that the temperature of the cold air is decreased in turn from one target region to another. In other words, the temperature stimuli at least include a stimulus given by a conditioned air, and the stimulation controller 203 changes at least one of the presence/absence, temperature, and amount of air of the temperature stimuli in rotation so as to sequentially increase the intensities of the temperature stimuli to the target regions (i.e., multiple types of temperature stimuli).

When hot air is used as the temperature stimulus, the intensities may be changed in rotation by making adjustments such that the temperature of the hot air is increased from one target region to another. An adjustment for increasing the amount of air from one target region to another, for example, may be an adjustment that brings about a difference of a certain level or more (e.g., a difference of 1 m/s to 1.5 m/s or more) in the amount of air for each of the target regions. In the examples described below, the air amount will be represented by flow rate. An adjustment for increasing the intensity from one target region to another in the case of using the temperature of conditioned air as the temperature stimulus may be an adjustment that brings about a difference of a certain level or more (e.g., a difference of 10° C.) in the temperature of conditioned air for each of the target regions.

The fluctuation controller 209 changes the respective intensities of the temperature stimuli generated by the air conditioner 5 so that there are fluctuations in each temperature stimulus intensity. The fluctuations referred to here mean conditions where the intensity of a temperature stimulus varies such as to periodically increase and decrease from a reference intensity, or conditions where a temperature stimulus is generated intermittently.

The temperature stimulus intensity control carried out by the rotation controller 204 will now be described with reference to FIG. 4 to FIG. 9. One example will be described with reference to FIG. 4 to FIG. 9 where there are three types of temperature stimuli, i.e., a temperature stimulus to the face A, a temperature stimulus to the hands B, and a temperature stimulus to the torso C. The vertical axis of the graphs in FIG. 4 to FIG. 9 represents intensity, while the horizontal axis represents time.

Figure 4:
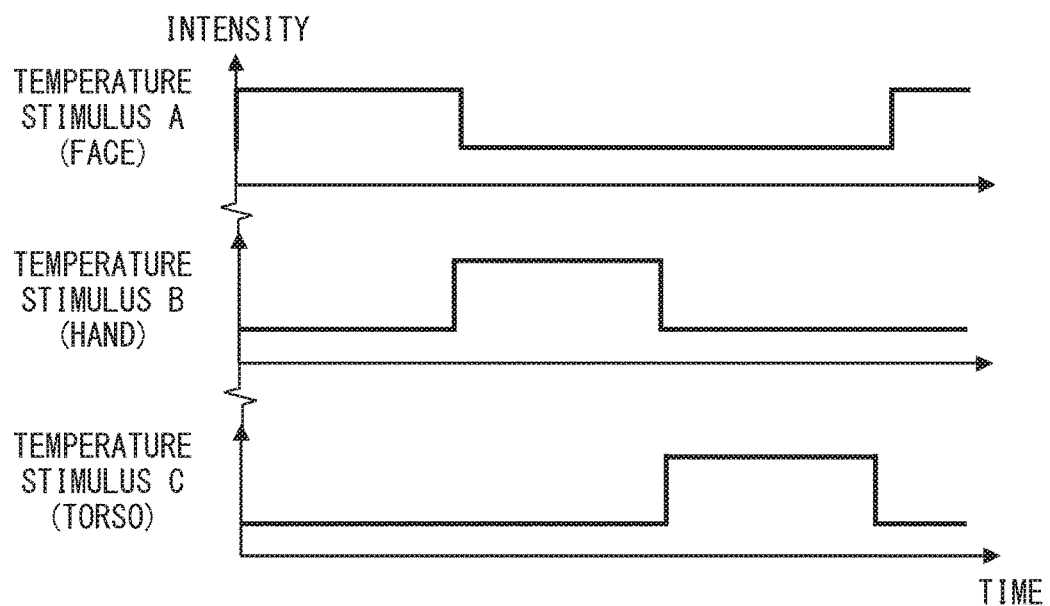
FIG. 4 is a diagram for explaining one example of temperature stimulus intensity control carried out by a rotation controller.

The rotation controller 204 successively increases the intensities of multiple types of temperature stimuli in rotation as shown in FIG. 4. When the intensity of one type of temperature stimulus is increased, the rotation controller 204 lowers the intensities of other types of temperature stimuli. FIG. 4 shows an example where the intensities are increased successively in the order of the temperature stimulus to the face A, temperature stimulus to the hands B, and temperature stimulus to the torso C.

The rotation controller 204 further includes the sequence controller 205, rapidity controller 206, change period controller 207, and intensity controller 208, and controls or switches the timing at which the intensities of multiple types of temperature stimuli are increased, time, upper and/or lower limits of intensity, and rate of change per time of intensity (i.e., rapidity) in the air conditioner 5. Through the switching, the rotation controller 204 changes the mode of generation of multiple types of temperature stimuli generated by the air conditioner 5.

The sequence controller 205 controls the rotation sequence of the temperature stimuli generated by the air conditioner 5. For example, the sequence controller 205 may be configured to control the rotation sequence in accordance with the default set values regarding the rotation sequence previously stored in the non-volatile memory of the HCU 20.

Figure 5:
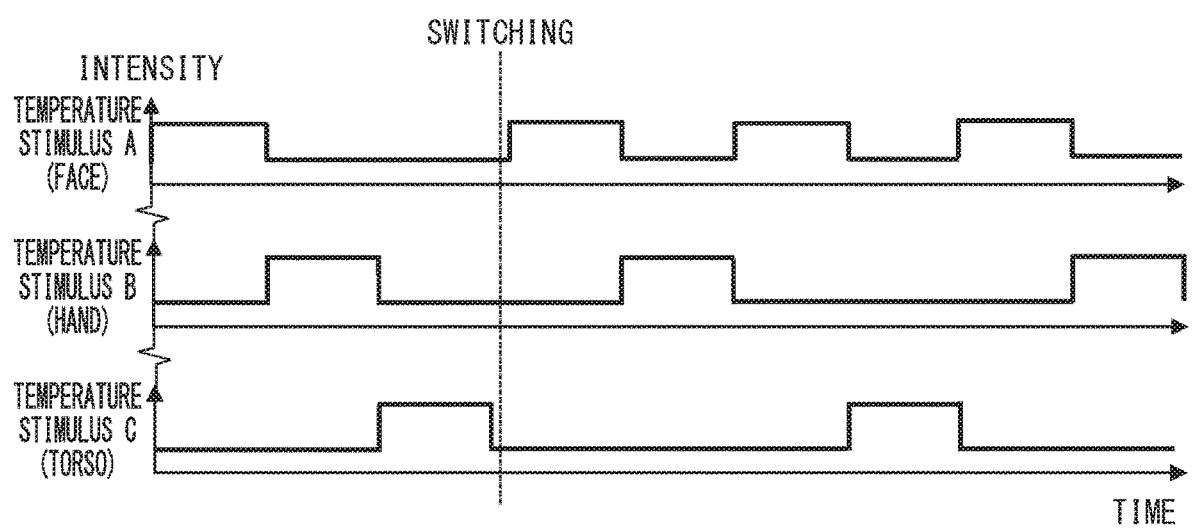
FIG. 5 is a diagram for explaining one example of temperature stimulus intensity control carried out by the rotation controller.

The sequence controller 205 switches around the sequence of increasing the intensities of multiple types of temperature stimuli generated by the air conditioner 5 in rotation when the change trigger detector 202 detects the change trigger, such that the rate at which the temperature stimulus to the face is intensified is increased, as shown in FIG. 5. Since the rate at which the temperature stimulus to the face, which is a body part with a particularly high sensitivity to a temperature stimulus, is intensified is increased, the alerting effect is enhanced even more.

FIG. 5 shows one example where the rotation by default in the order of face, hand, torso, face, hand, and torso is switched to face, hand, face, torso, face, hand, face, and torso. In an alternative configuration, the sequence controller 205 may switch the rotation sequence to other sequences than the example shown in FIG. 5, as long as the rate at which the temperature stimulus to the face is intensified is increased.

The rapidity controller 206 controls the rapidity of change in intensity when the intensities of multiple types of temperature stimuli generated by the air conditioner 5 are changed to higher ones in rotation. For example, the rapidity controller 206 may be configured to control the rapidity of change in intensity in accordance with the default set values regarding the rate of change per time when the intensity of a temperature stimulus is changed, which are previously stored in the non-volatile memory of the HCU 20.

Figure 6:
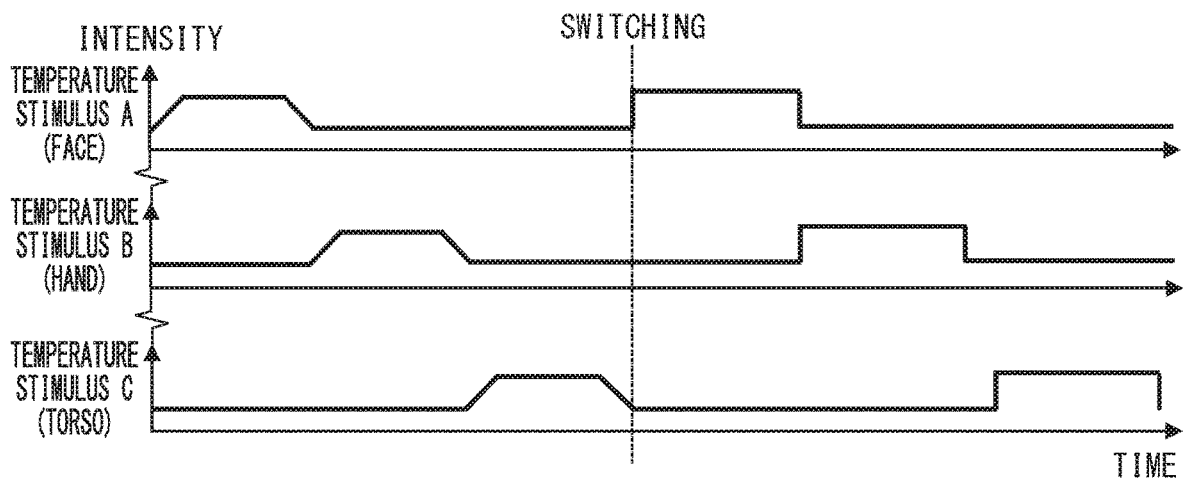
FIG. 6 is a diagram for explaining one example of temperature stimulus intensity control carried out by the rotation controller.

The rapidity controller 206 switches the rapidity of changes in the intensities of multiple types of temperature stimuli generated by the air conditioner 5 to a higher one when the change trigger detector 202 detects the change trigger, as shown in FIG. 6. By switching the rapidity of changes in the intensities to a higher one, the temperature stimuli are made easier for the driver to be aware of, even when the alerting effect by the temperature stimuli has diminished, so that the driver is less likely to be habituated to the temperature stimuli, and this way the alerting effect can be enhanced.

In an alternative configuration, when the change trigger detector 202 detects the change trigger, the rapidity controller 206 may switch the rapidity of change in the intensity of the temperature stimulus to the face, of multiple types of temperature stimuli generated by the air conditioner 5, to a higher one as compared to the temperature stimuli to other parts. Both configurations are possible where the rapidity of changes in the intensities of temperature stimuli to other parts is switched, or not switched.

The change period controller 207 controls the periods of changes when the intensities of multiple types of temperature stimuli generated by the air conditioner 5 are changed to higher ones in rotation (also referred to as change periods). For example, the change period controller 207 may be configured to control the change periods in accordance with the default set values regarding the change periods previously stored in the non-volatile memory of the HCU 20.

Figure 7:
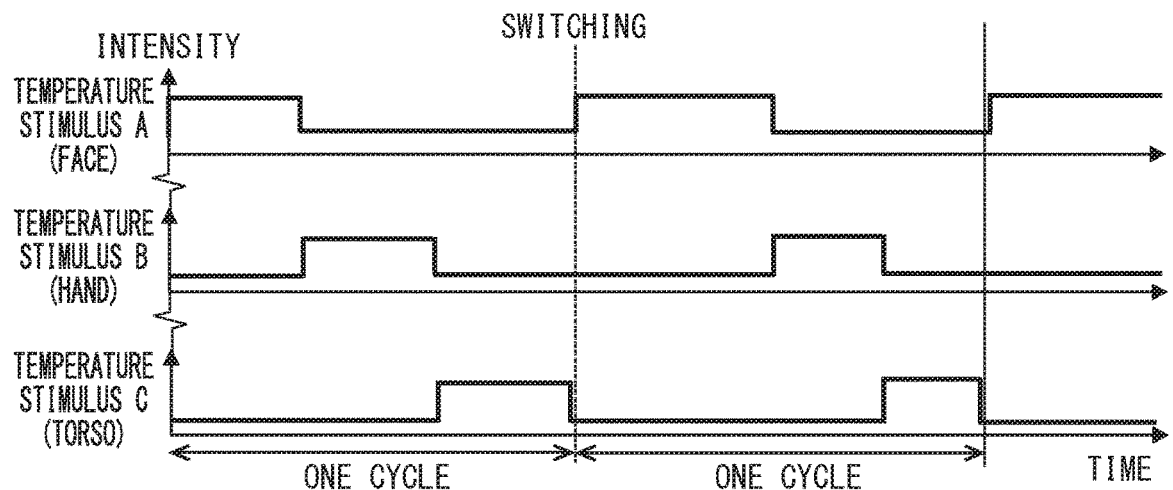
FIG. 7 is a diagram for explaining one example of temperature stimulus intensity control carried out by the rotation controller.

The change period controller 207 switches the change periods such that the time in which the temperature stimulus to the face, of multiple types of temperature stimuli generated by the air conditioner 5, is continuously intensified is prolonged as shown in FIG. 7 when the change trigger detector 202 detects the change trigger. Since the time for continuous intensification of the temperature stimulus to the face, which is a body part with a particularly high sensitivity to a temperature stimulus, is increased, the alerting effect is enhanced even more.

When the change period controller 207 switches the change periods such that the time in which the temperature stimulus to the face is continuously intensified is prolonged as shown in FIG. 7, it may be preferable to switch the change periods such that the time in which the temperature stimuli to other parts are continuously intensified is relatively shortened, so that the overall time for the temperature stimuli per one cycle of rotation is not changed. With this, while the alerting effect is enhanced by increasing the time in which the temperature stimulus to the face is continuously intensified, it is prevented that the driver is cooled too much, by not changing the overall time for the temperature stimuli to the entire target regions.

In an alternative configuration, when the change period controller 207 switches the change periods such that the time in which the temperature stimulus to the face is continuously intensified is prolonged, the time in which the temperature stimuli to other parts is continuously intensified does not have to be changed. In this case, the alerting effect can be enhanced.

The intensity controller 208 controls the upper and/or lower intensity limits of each of the multiple types of temperature stimuli generated by the air conditioner 5 when the intensities are changed to higher ones in rotation. The upper limit and lower limit of a temperature stimulus may be rephrased as the two levels of intensity, the intensified level and the weakened level, of the temperature stimulus when it is changed in rotation. The intensity controller 208 may be configured to control the upper and/or lower intensity limits of the temperature stimuli in accordance with the default set values of the upper and lower intensity limits of the temperature stimuli previously stored in the non-volatile memory of the HCU 20.

Figure 8:
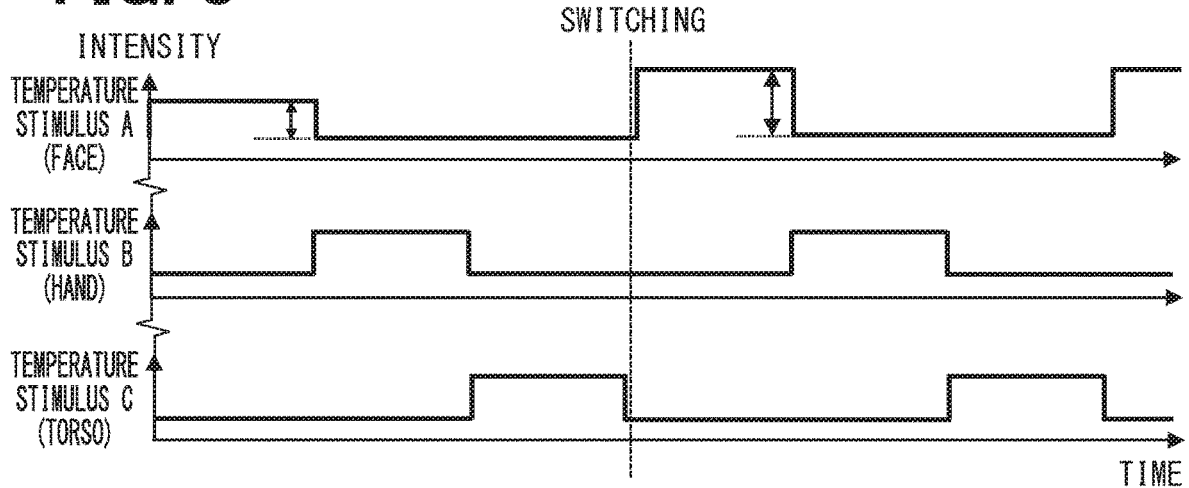
FIG. 8 is a diagram for explaining one example of temperature stimulus intensity control carried out by the rotation controller.

For example, the intensity controller 208 may be configured to switch the upper and/or lower intensity limits of multiple types of temperature stimuli generated by the air conditioner 5 such as to increase the difference between the upper and lower intensity limits (also referred to as difference between changed intensities) as shown in FIG. 8 when the change trigger detector 202 detects the change trigger.

The increased difference between the changed intensities makes it easier for the driver to be aware of the temperature stimuli, even when the alerting effect by the temperature stimuli has diminished, so that the driver is less likely to be habituated to the temperature stimuli, and this way the alerting effect can be enhanced. Both configurations are possible, where only the upper intensity limit is changed to increase the difference between the changed intensities, and where only the lower intensity limit is changed to increase the difference between the changed intensities. In another alternative configuration, both of the upper and lower intensity limits may be changed to increase the difference between the changed intensities.

In an alternative configuration, when the change trigger detector 202 detects the change trigger, the intensity controller 208 may change the intensity of the temperature stimulus to the face, of multiple types of temperature stimuli generated by the air conditioner 5, such that the difference between the changed intensities will be larger as compared to the temperature stimuli to other parts as shown in FIG. 8. With this configuration, the difference between the changed intensities of the temperature stimulus to the face, which is a body part with a particularly high sensitivity to a temperature stimulus, is increased, so that the alerting effect is enhanced even more. Both configurations are possible where the difference between changed intensities is switched, or not switched, for the temperature stimuli to other parts.

Figure 9:
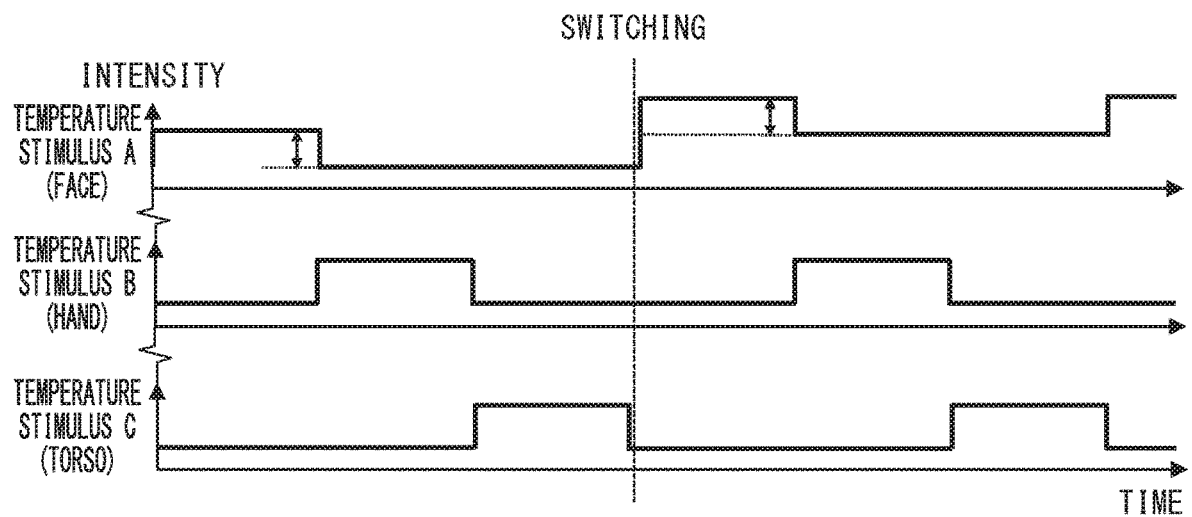
FIG. 9 is a diagram for explaining one example of temperature stimulus intensity control carried out by the rotation controller.

Alternatively, the intensity controller 208 may be configured to raise the upper and lower intensity limits of multiple types of temperature stimuli generated by the air conditioner 5 such that the difference between the changed intensities is maintained as shown in FIG. 9, when the change trigger detector 202 detects the change trigger. The intensity of the temperature stimuli being raised even more makes it easier for the driver to be aware of the temperature stimuli, even when the alerting effect by the temperature stimuli has diminished, so that the driver is less likely to be habituated to the temperature stimuli, and this way the alerting effect can be enhanced.

Alternatively, the intensity controller 208 may be configured to switch the intensity of the temperature stimulus to the face, of multiple types of temperature stimuli generated by the air conditioner 5, such that the upper and lower intensity limits are higher than those of the temperature stimuli to other parts, while the difference between the changed intensities is maintained, when the change trigger detector 202 detects the change trigger. With this configuration, the intensity of the temperature stimulus to the face, which is a body part with a particularly high sensitivity to a temperature stimulus, is increased, so that the alerting effect is enhanced even more. Both configurations are possible where the upper and lower intensity limits are switched, or not switched, for the temperature stimuli to other parts.

Next, the temperature stimulus intensity control carried out by the fluctuation controller 209 will be described with reference to FIG. 10 to FIG. 15. In the example described with reference to FIG. 10 to FIG. 15, there are three types of temperature stimuli, i.e., a temperature stimulus to the face A, a temperature stimulus to the hands B, and a temperature stimulus to the torso C. The vertical axis of the graphs in FIG. 10 to FIG. 15 represents intensity, while the horizontal axis represents time.

Figure 10:
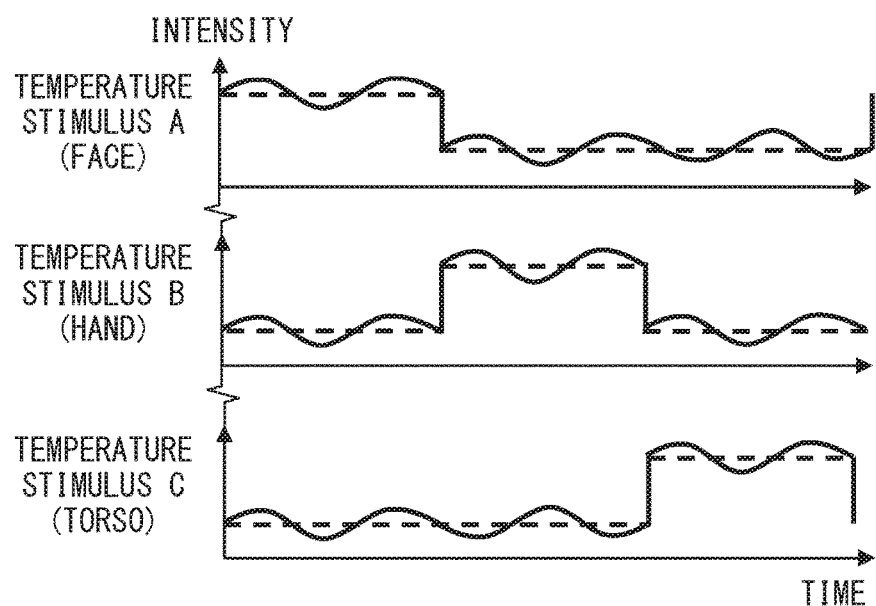
FIG. 10 is a diagram for explaining one example of temperature stimulus intensity control carried out by a fluctuation controller.

The fluctuation controller 209 changes the intensities of the temperature stimuli such that there are fluctuations in the intensity of each of the multiple types of temperature stimuli generated by the air conditioner 5, as shown in FIG. 10. FIG. 10 shows an example where the intensity of each of the temperature stimulus to the face A, temperature stimulus to the hands B, and temperature stimulus to the torso C is increased and decreased periodically from a reference intensity (see broken lines in FIG. 10) that is the intensity in accordance with the set value used for the control by the rotation controller 204.

Figure 11:
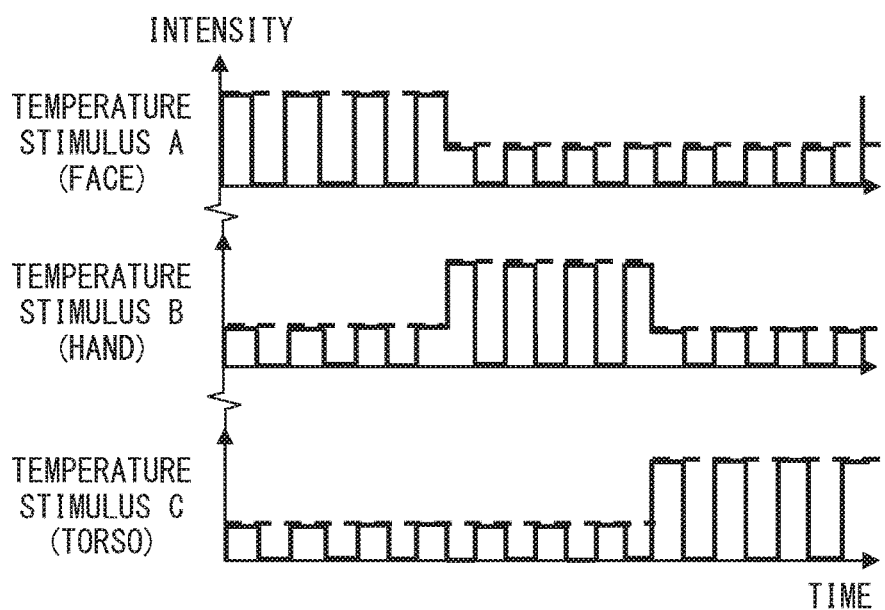
FIG. 11 is a diagram for explaining one example of temperature stimulus intensity control carried out by the fluctuation controller.

Alternatively, as shown in FIG. 11, the fluctuation controller 209 may be configured to generate each temperature stimulus intermittently to the level of the reference intensity (see broken lines in FIG. 11). When the configuration for generating each temperature stimulus intermittently is adopted, the intermittent temperature stimuli may be given such that an emphasis is put on the temperature stimulus to the face to enhance the alerting effect by not generating temperature stimuli to other parts than the face when the temperature stimulus to the face is being provided.

The fluctuation period controller 210 controls the periods of fluctuations (also referred to as a fluctuation period) when the intensities of the temperature stimuli are changed such that there are fluctuations in the intensity of each of the multiple types of temperature stimuli generated by the air conditioner 5. For example, the fluctuation period controller 210 may be configured to control the fluctuation periods in accordance with the default set values regarding the fluctuation periods previously stored in the non-volatile memory of the HCU 20.

Figure 12:
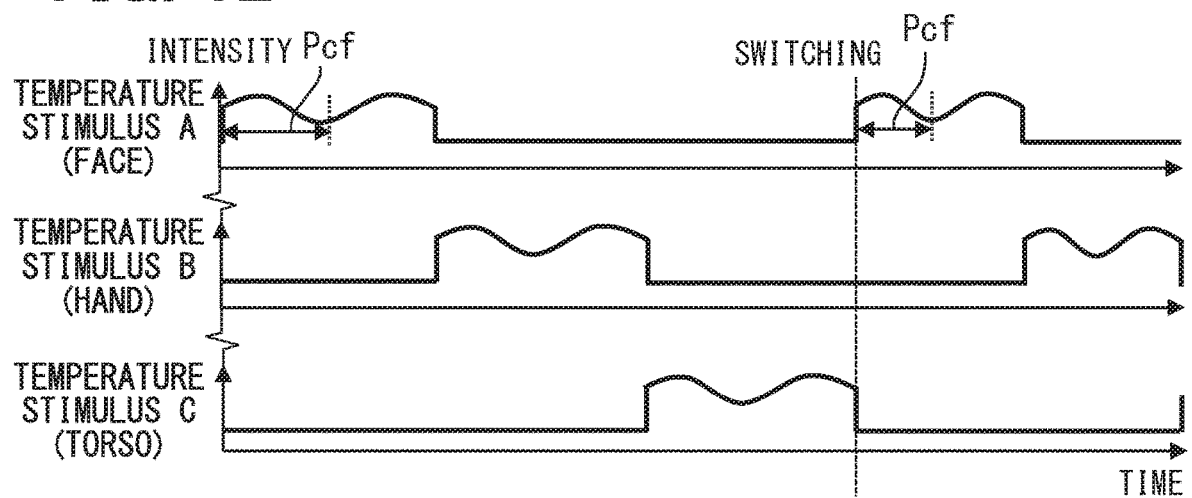
FIG. 12 is a diagram for explaining one example of temperature stimulus intensity control carried out by the fluctuation controller.
Figure 13:
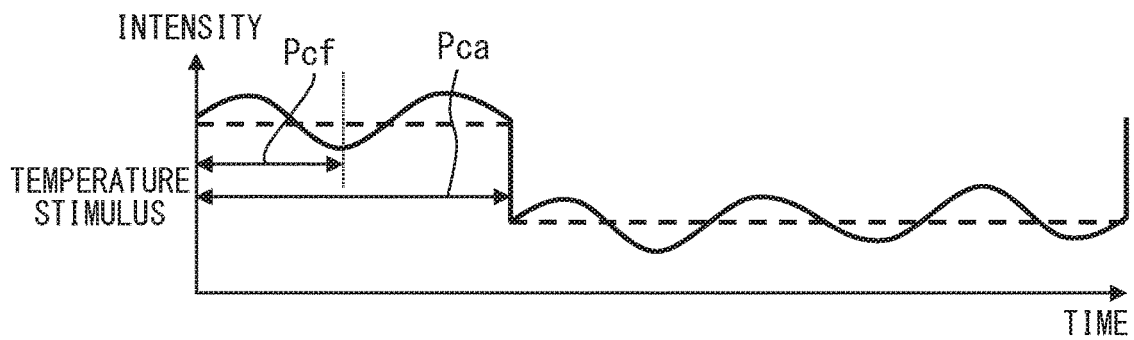
FIG. 13 is a diagram for explaining one example of temperature stimulus intensity control carried out by the fluctuation controller.

The fluctuation period controller 210 switches the periods of fluctuations of multiple types of temperature stimuli generated by the air conditioner 5 to shorter ones as shown in FIG. 12 when the change trigger detector 202 detects the change trigger. In the example described with reference to FIG. 12 and subsequent figures, i.e., from FIG. 13 to FIG. 15, the fluctuations are generated by periodically varying the intensity up and down around the reference intensity. Pcf in FIG. 12 represents the fluctuation period. The fluctuation periods being shortened makes it easier for the driver to be aware of the temperature stimuli, even when the alerting effect by the temperature stimuli has diminished, so that the driver is less likely to be habituated to the temperature stimuli, and this way the alerting effect can be enhanced.

When switching the fluctuation period (see Pcf in FIG. 13), the fluctuation period controller 210 compares the fluctuation period after switching with the change period (see Pca in FIG. 13) being controlled by the change period controller 207. When the fluctuation period is equal to or longer than the change period, the fluctuation period after switching is altered to one that is shorter than the change period. Namely, in switching the fluctuation period, the fluctuation period controller 210 switches the fluctuation period to a shorter one than the change period. This is because, when the fluctuation period is equal to or longer than the change period, the rotation of intensities of the temperature stimuli varied by the change period controller 207 and the fluctuations in the intensities of the temperature stimuli given by the fluctuation period controller 210 will confuse the driver, and the effect of maintaining the alert state provided by the synergetic effect of the intensity rotation and fluctuations will be weakened.

The fluctuation amplitude controller 211 controls the fluctuation amplitude of fluctuations in the intensities of the temperature stimuli when the intensities of the temperature stimuli are changed such that there are fluctuations in the intensity of each of the multiple types of temperature stimuli generated by the air conditioner 5. The fluctuation amplitude may be rephrased as a difference between an upper limit and a lower limit of the fluctuation in the intensity of the temperature stimulus. For example, the fluctuation amplitude controller 211 may be configured to control the fluctuation amplitude in accordance with the default set values regarding the fluctuation amplitude previously stored in the non-volatile memory of the HCU 20.

Figure 14:
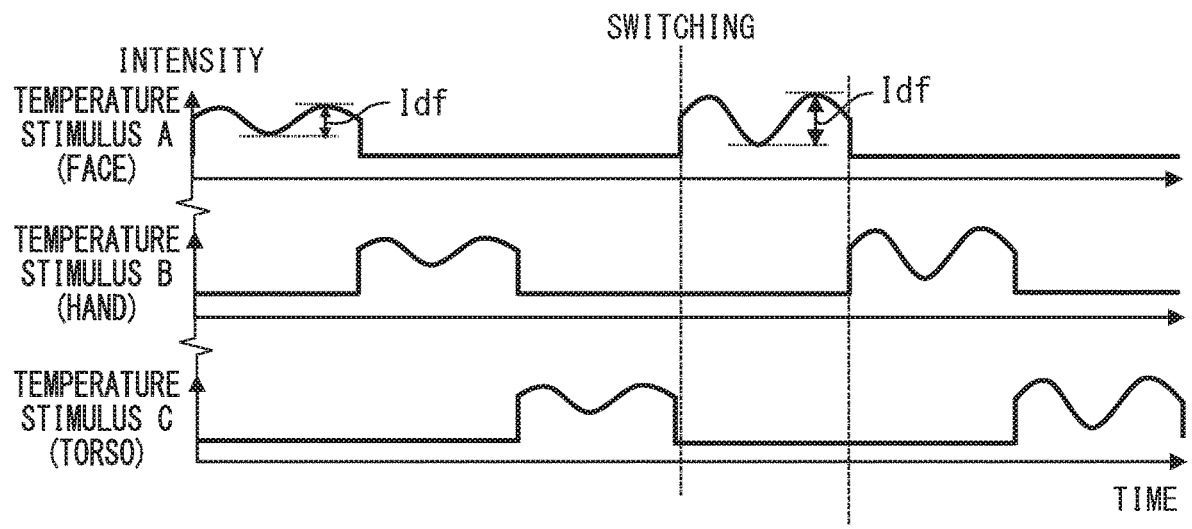
FIG. 14 is a diagram for explaining one example of temperature stimulus intensity control carried out by the fluctuation controller.
Figure 15:
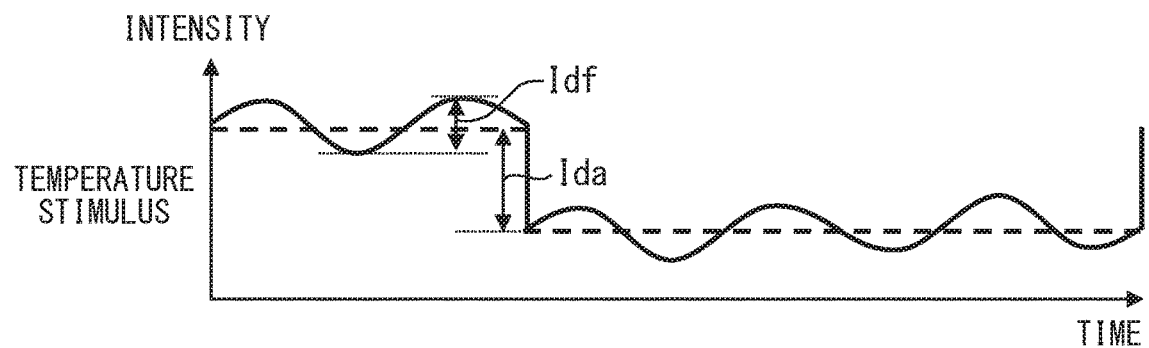
FIG. 15 is a diagram for explaining one example of temperature stimulus intensity control carried out by the fluctuation controller.

The fluctuation amplitude controller 211 switches the fluctuation amplitudes of multiple types of temperature stimuli generated by the air conditioner 5 to larger ones as shown in FIG. 14 when the change trigger detector 202 detects the change trigger. Idf in FIG. 14 represents the fluctuation period. The fluctuation amplitude being switched to a larger one makes it easier for the driver to be aware of the temperature stimuli, even when the alerting effect by the temperature stimuli has diminished, so that the driver is less likely to be habituated to the temperature stimuli, and this way the alerting effect can be enhanced. All configurations are possible, where only the upper limit of fluctuation amplitude is varied to switch the fluctuation amplitude, or where only the lower limit of fluctuation amplitude is varied to switch the fluctuation amplitude, or where both of the upper limit and lower limit of fluctuation amplitude are varied to switch the fluctuation amplitude.

When switching the fluctuation amplitude (see Idf in FIG. 15), the fluctuation amplitude controller 211 compares the fluctuation amplitude after switching with the difference between changed intensities (see Ida in FIG. 15) being controlled by the intensity controller 208. When the fluctuation amplitude is equal to or larger than the difference between changed intensities, the fluctuation amplitude after switching is altered to a smaller one so that the difference between the upper limit and the lower limit of intensity of the fluctuation is smaller than the difference between changed intensities. Namely, in switching the fluctuation amplitude, the fluctuation amplitude controller 211 switches the fluctuation amplitude to a smaller one than the difference between changed intensities. This is because, when the fluctuation amplitude is equal to or larger than the difference between changed intensities, the rotation of intensities of the temperature stimuli varied by the intensity controller 208 and the fluctuations in the intensities of the temperature stimuli given by the fluctuation amplitude controller 211 will confuse the driver, and the effect of maintaining the alert state provided by the synergetic effect of the intensity rotation and fluctuations will be weakened.

(Alerting Stimulus-Related Process at HCU)

One example of the flow of process related to the control performed by the HCU 20 for generating temperature stimuli (also referred to as an alerting stimulus-related process) will be described with reference to the flowchart of FIG. 16. The flowchart of FIG. 16 may be carried out, for example, in a configuration where the HCU 20 is turned on and the process is started when the ignition power switch of the subject vehicle is turned on.

If the start trigger detector 201 detects a start trigger for generating an alerting stimulus at S1 (YES at S1), the process goes to S3. If the start trigger is not detected (NO at S1), the process goes to S2. If it is an end timing of the alerting stimulus-related process at S2 (YES at S2), the alerting stimulus-related process terminates. If it is not the end timing of the alerting stimulus-related process at S2 (NO at S2), the process goes back to S1 and repeats itself. Examples of end timing of the alerting stimulus-related process include the ignition power switch of the subject vehicle being turned off, a switchover to automated driving of an automation level in which the driver need not be watchful, and the like.

At S3, the stimulation controller 203 causes multiple types of temperature stimuli such as a temperature stimulus to the face, a temperature stimulus to the hands, and a temperature stimulus to the torso to be generated simultaneously from the air conditioner 5. At S4, the rotation controller 204 changes the intensities of multiple types of temperature stimuli generated by the air conditioner 5 in rotation. Namely, a rotating feature is added to the temperature stimuli generated by the air conditioner 5. The sequence, rapidity of change in intensity, change period, and upper and lower limits of intensity when changing the intensities of temperature stimuli in rotation are controlled by the sequence controller 205, rapidity controller 206, change period controller 207, and intensity controller 208 in accordance with the default set values.

At S5, the fluctuation controller 209 causes fluctuations to be produced in the intensities of multiple types of temperature stimuli generated by the air conditioner 5. Namely, fluctuations are added to the temperature stimuli generated by the air conditioner 5. When fluctuations are produced in the intensities of the temperature stimuli, the fluctuation period and the fluctuation amplitude are controlled by the fluctuation period controller 210 and the fluctuation amplitude controller 211 in accordance with the default set values.

At S6, if a prescribed time having elapsed from the start of generation of temperature stimuli at S3 is detected by the change trigger detector 202 as the change trigger (YES at S6), the process goes to S9. The process goes to S9 because the alerting effect that has been given by the temperature stimuli so far is assumed to be weakening. If a prescribed time having elapsed from the start of generation of temperature stimuli at S3 is not detected by the change trigger detector 202 as the change trigger (NO at S6), the process goes to S7.

At S7, if the drowsiness detected by the DSM 21 being equal to or more than a threshold is detected by the change trigger detector 202 as the change trigger (YES at S7), the process goes to S9. The process goes to S9 because the alerting effect that has been given by the temperature stimuli so far is deemed not satisfactory. If the drowsiness detected by the DSM 21 being equal to or more than the threshold is not detected by the change trigger detector 202 as the change trigger (NO at S7), the process goes to S8. At S8, if it is an end timing of the alerting stimulus-related process (YES at S8), the generation of temperature stimuli from the air conditioner 5 is stopped, and the alerting stimulus-related process terminates. If it is not the end timing of the alerting stimulus-related process (NO at S8), the process goes back to S6 and repeats itself.

At S9, the stimulation controller 203 performs a control changeover-related process to change the mode of generation of temperature stimuli from the previous one, and the process goes to S10. One example of the flow of the control changeover-related process will now be described with reference to the flowchart of FIG. 17.

First, at S91, the sequence controller 205 switches the sequence of successively increasing intensities of the multiple types of temperature stimuli generated by the air conditioner 5 in rotation such that the rate at which the temperature stimulus to the face is intensified is increased. At S92, the change period controller 207 switches the change periods so that the time in which the temperature stimulus to the face, of the multiple types of temperature stimuli generated by the air conditioner 5, is continuously intensified is prolonged. At S93, the intensity controller 208 switches the intensity of the temperature stimulus to the face, of the multiple types of temperature stimuli generated by the air conditioner 5, to a higher one as compared to the temperature stimuli to other parts. In an alternative configuration, the difference between changed intensities of the temperature stimulus to the face, of the multiple types of temperature stimuli generated by the air conditioner 5, may be switched to a larger one as compared to the temperature stimuli to other parts. At S94, the rapidity controller 206 switches the rapidity of change in intensity of the multiple types of temperature stimuli generated by the air conditioner 5 to a larger one. In an alternative configuration, the rapidity of the change in intensity of the temperature stimulus to the face, of the multiple types of temperature stimuli generated by the air conditioner 5, may be switched to a larger one as compared to the temperature stimuli to the other parts.

At S95, the fluctuation amplitude controller 211 switches the fluctuation amplitudes of the multiple types of temperature stimuli generated by the air conditioner 5 to larger ones. At S96, the fluctuation amplitude controller 211 compares the fluctuation amplitude after switching at S95 with the current difference between changed intensities being controlled by the intensity controller 208. If the fluctuation amplitude is smaller than the difference between changed intensities (YES at S96), the process goes to S98. If the fluctuation amplitude is equal to or larger than the difference between changed intensities (NO at S96), the process goes to S97. At S97, the fluctuation amplitude controller 211 changes the fluctuation amplitude after switching at S95 to a different one from the fluctuation amplitude before switching at S95 and smaller than the current difference between changed intensities.

At S98, the fluctuation period controller 210 switches the fluctuation periods of the multiple types of temperature stimuli generated by the air conditioner 5 to shorter ones. At S99, the fluctuation period controller 210 compares the fluctuation period after switching at S98 with the current change period being controlled by the change period controller 207. If the fluctuation period is shorter than the change period (YES at S99), the process goes to S10. If the fluctuation period equals to or longer than the change period (NO at S99), the process goes to S100. At S100, the fluctuation period controller 210 changes the fluctuation period after switching at S98 to a different one from the fluctuation period before switching at S98 and shorter than the current change period.

Referring back to FIG. 16, at S10, if the drowsiness detected by the DSM 21 is equal to or higher than the threshold (YES at S10), the process goes back to S9 and repeats itself. Namely, if the alerting effect achieved by the previous control changeover-related process is not satisfactory, the mode of generation of temperature stimuli is changed further by the control changeover-related process to enhance the alerting effect. If the drowsiness detected by the DSM 21 is lower than the threshold (NO at S10), the process goes to S11. Whether the drowsiness detected by the DSM 21 is equal to or higher than the threshold or not may be determined by the stimulation controller 203.

In an alternative configuration, the step of S10 may be performed on condition that a certain time has elapsed from a change in the mode of generation of the temperature stimuli made by the control changeover-related process at S9. A certain time herein may be any period of time that can be set suitably.

At S11, the rotation controller 204 and the fluctuation controller 209 return the generation mode of temperature stimuli that has been changed by the control changeover-related process at S9 back to the mode of generation before the detection of the change trigger at S6 or S7, and the process goes to S12.

At S12, if it is the end timing of the alerting stimulus-related process (YES at S12), the generation of temperature stimuli from the air conditioner 5 is stopped, and the alerting stimulus-related process terminates. If it is not the end timing of the alerting stimulus-related process (NO at S12), the process goes back to S10 and repeats itself.

Figure 16:
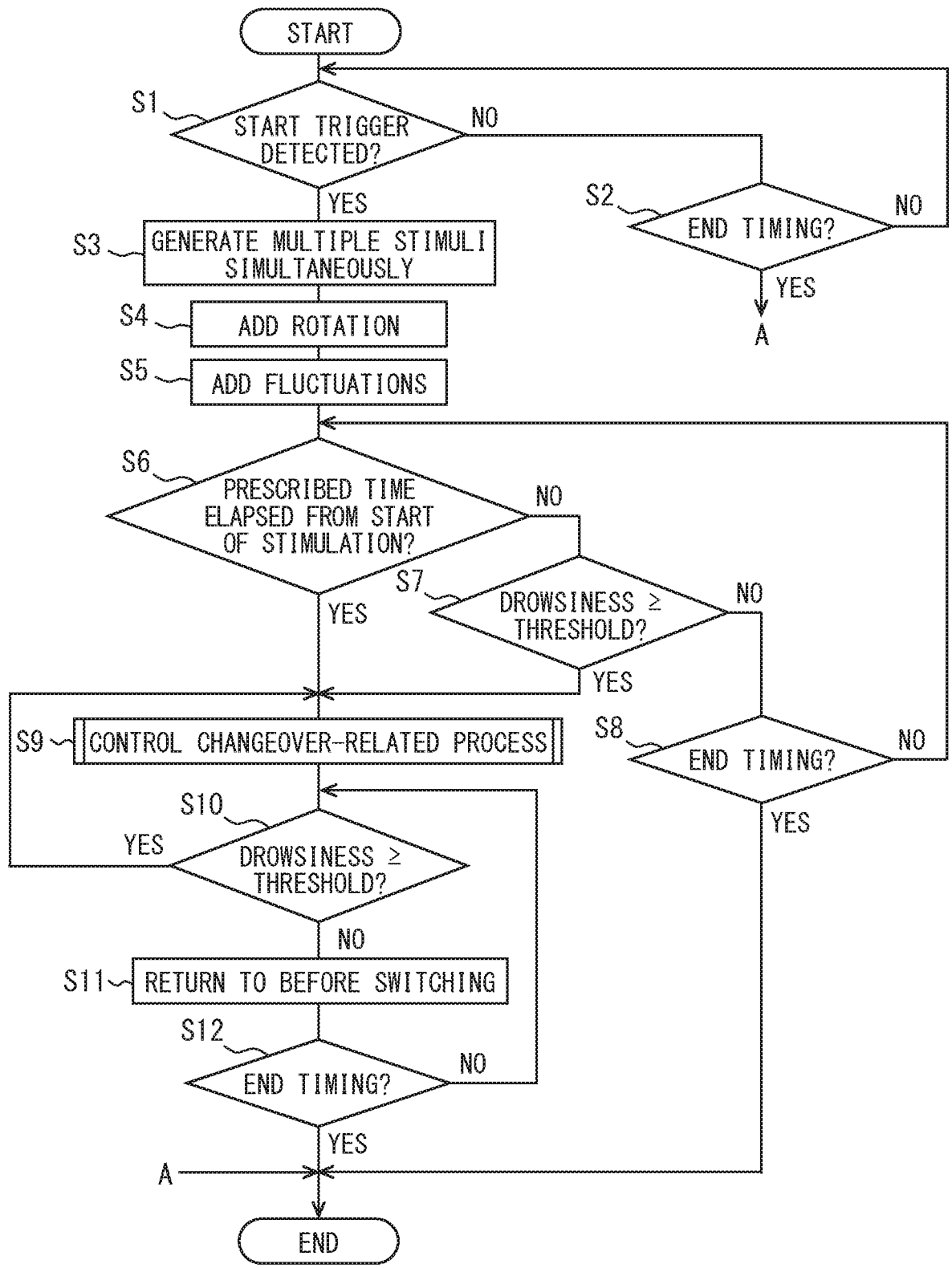
FIG. 16 is a flowchart showing one example of a flow of an alerting stimulus-related process by an HCU.
Figure 17:
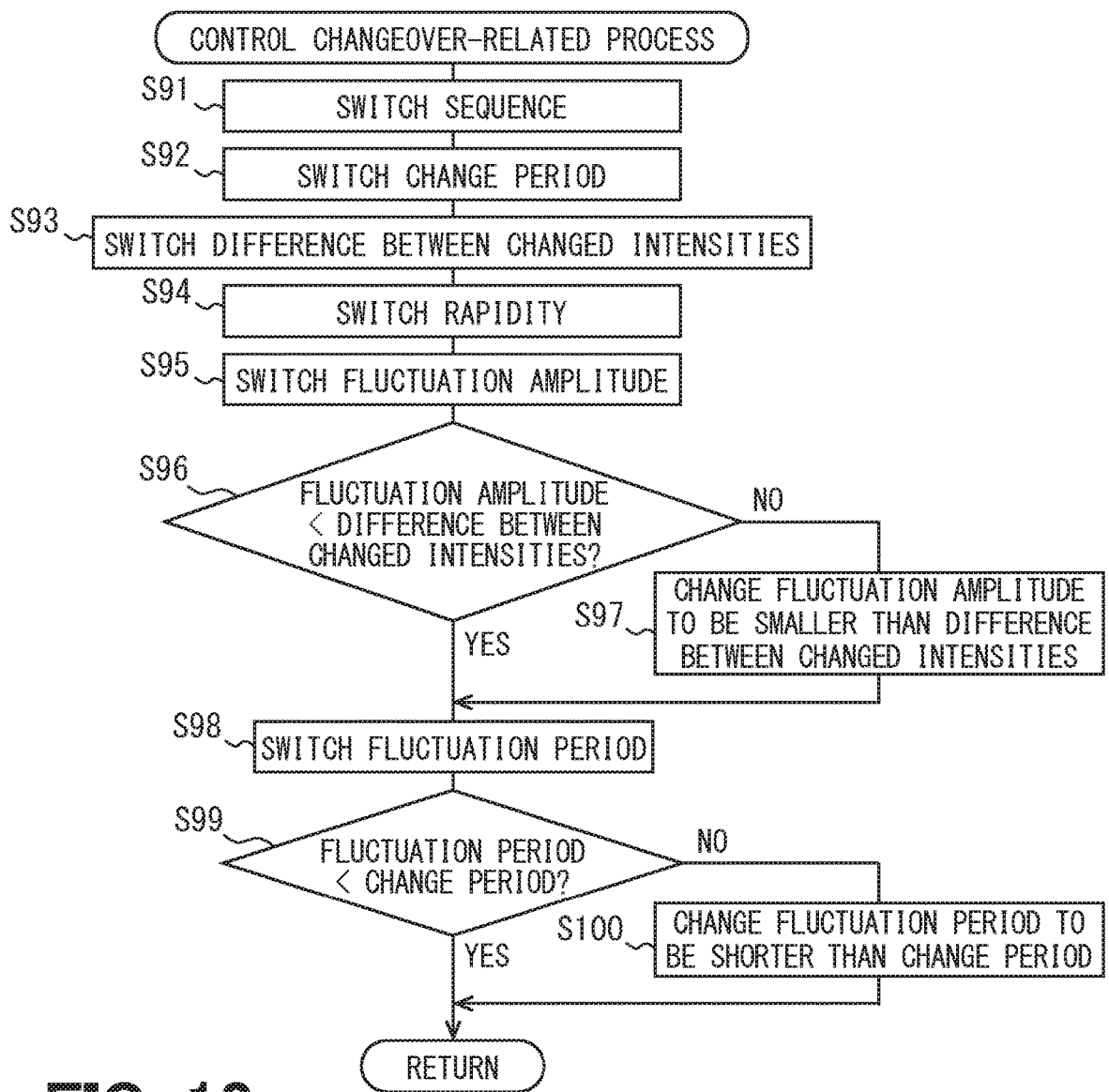
FIG. 17 is a flowchart showing one example of a flow of a control changeover-related process by the HCU.

While one configuration is shown by the flowchart of FIG. 16 where all the features of the mode of generation of temperature stimuli such as the sequence, rapidity of change in the intensity, change period, and upper and/or lower intensity limits when changing the intensities of temperature stimuli in rotation, as well as the fluctuation period and fluctuation amplitude when fluctuations are produced in the intensities of the temperature stimuli, are switched if the change trigger is detected, the system is not limited to this configuration. For example, in an alternative configuration, the features of the mode of generation of temperature stimuli may be changed one by one, while the stimulation controller 203 may determine each time whether or not the drowsiness detected by the DSM 21 has reached or exceeded the threshold, and if the DSM 21 continues to determine that the drowsiness is equal to or higher than the threshold, the number of the features of the generation mode of temperature stimuli to be changed may be increased one by one. Both configurations are possible where the steps S96 and S97 in the flowchart of FIG. 17 are omitted, and where the steps S99 and S100 are omitted.

In another alternative configuration, when the change trigger is detected, of the rotation and fluctuations described above, only the rotation may be performed before a predetermined time elapses, and after the predetermined time elapses, fluctuations may be given in addition to the rotation. A predetermined time herein may be any period of time that can be set suitably. The predetermined time may be longer than the prescribed time mentioned above. If the predetermined time is set longer than the prescribed time mentioned above, the steps S6 to S12 may be performed without the step of S5 until the predetermined time elapses, and when the predetermined time elapses, the step of S5 may be performed, before carrying out the steps S9 to S12.

In another alternative configuration, the prescribed time having elapsed from the start of generation of temperature stimuli at S3 does not have to be detected by the change trigger detector 202 as the change trigger. In this case, S6 in the flowchart of FIG. 16 may be omitted, and the process may go from S5 to S7.

Figure 18:
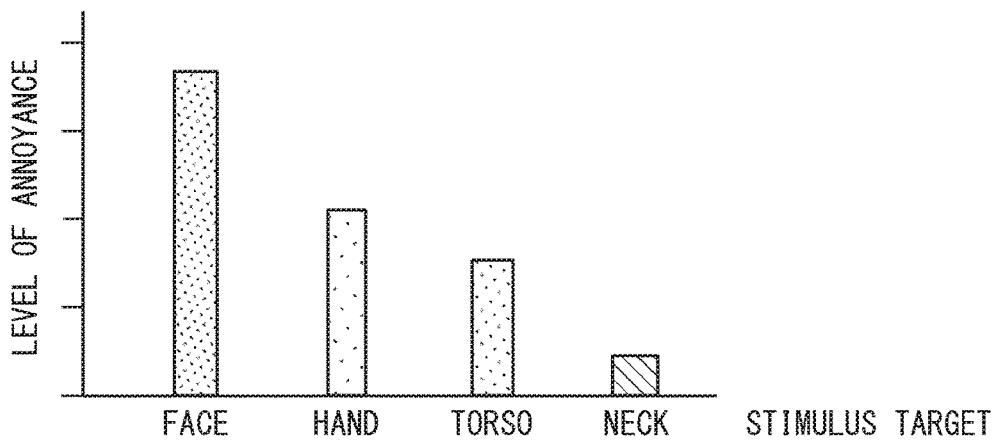
FIG. 18 is a diagram illustrating examples of annoyance levels with respect to temperature stimuli given by cold air for various parts of the body.

FIG. 18 shows annoyance levels with respect to temperature stimuli given by cold air for various parts of the body. Since a stimulus is felt more annoying in parts with higher sensitivity, it is felt most annoying in the face with the highest sensitivity among the face, hands, torso, and neck as shown in FIG. 18, the hands and the torso being the next in line, and it is felt least annoying in the neck with the lowest sensitivity. As is clear from FIG. 18, while the face, hands, and torso have a high sensitivity to a temperature stimulus, the neck has a very low sensitivity to a temperature stimulus. The more the driver finds the temperature stimulus annoying, the more likely the driver becomes aware of the temperature stimulus, hence the higher alerting effect.

With the configuration of the first embodiment, temperature stimuli for maintaining an alert state of the driver are given not only to the hands of the driver but also to the face and torso, which are body parts with a particularly high sensitivity to a temperature stimulus, so that a higher alerting effect can be obtained.

Since multiple types of temperature stimuli are generated simultaneously, the driver is less likely to become habituated to the stimulus as compared to when a uniform temperature stimulus is produced. Moreover, since the intensities of multiple types of temperature stimuli are changed in rotation, or fluctuations are added, it is less likely that the driver becomes habituated to each temperature stimulus, and thus a higher alerting effect can be achieved.

Figure 19:
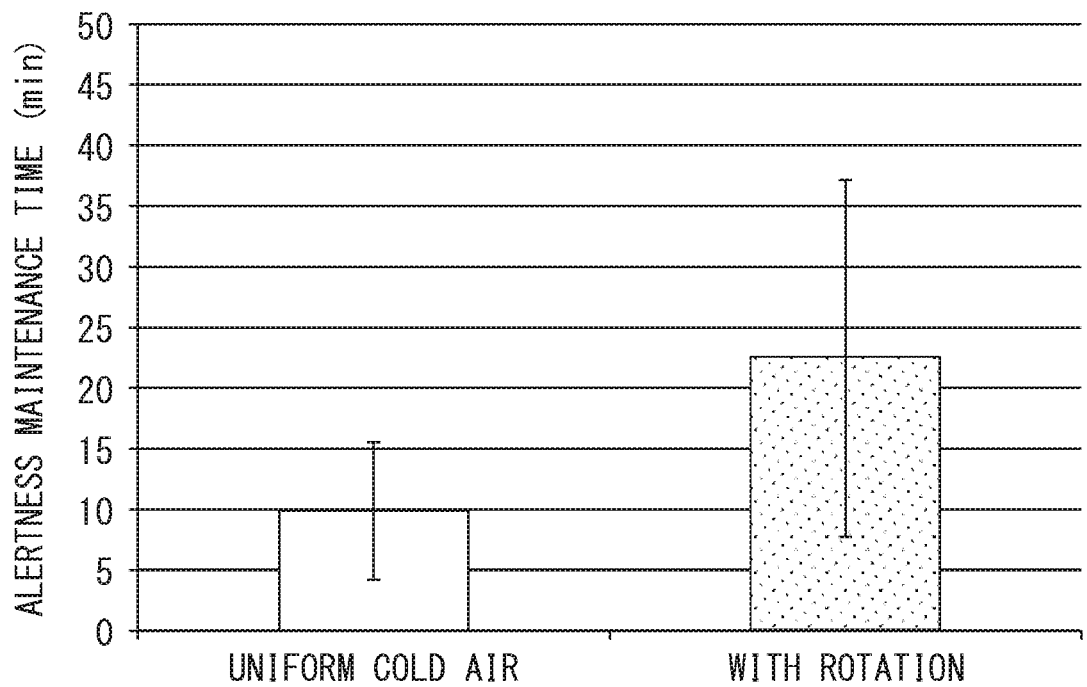
FIG. 19 is a diagram for explaining the alerting effect achieved by rotating the intensities of multiple types of temperature stimuli.

One example is given in FIG. 19 that shows the alerting effect achieved by changing the intensities of multiple types of temperature stimuli in rotation. FIG. 19 is a diagram showing a comparison between the alertness maintenance time when a temperature stimulus was given by a uniform stream of cold air, and the alertness maintenance time when the intensities of multiple types of temperature stimuli were changed in rotation. Ten and several test subjects were made to continue driving in a driving simulator, with temperature stimulus being started when the drowsiness level 2 was reached. FIG. 19 shows examples of average values of measurement results of the alertness maintenance time during which a state with less than the drowsiness level 2 was maintained, from a time point when the drowsiness level dropped to below level 2.

In the example of FIG. 19, temperature stimuli for each of the target regions such as face, hand, and torso, using cold air, are used as multiple types of temperature stimuli. In the example shown in FIG. 19, the amount of cold air was changed while the temperature of the cold air was fixed, when changing the intensities of the temperature stimuli from one target region to another on a rotational basis. In the example of FIG. 19, the intensities of the temperature stimuli were rotated such that the amount of cold air to a target region for which the stimulus is to be intensified was increased by about 1 m/s as compared to the amount of cold air to other target regions. FIG. 19 shows one example where the process of the flowchart of FIG. 16 was executed without the steps S5 to S11. In the experiment, uniform cold air was used as the temperature stimulus, at the temperature of 15° C. in the amount of 2.5 m/s.

As shown in FIG. 19, as compared to the alertness maintenance time when the temperature stimulus is given by a uniform stream of cold air, the alertness maintenance time is nearly twice higher when the intensities of multiple types of temperature stimuli are increased in rotation, i.e., a very high alerting effect is achieved.

Moreover, when the change trigger is detected in situations where temperature stimuli are being generated, the mode of generation of the temperature stimuli generated by the air conditioner 5 is changed. Therefore, even when the alerting effect is weakened because of habituation to the rotation and fluctuations, habituation of temperature stimuli is very unlikely by changing rotation and fluctuations. Switching of the sequence when increasing the intensities of temperature stimuli in rotation is considered to be particularly recognizable for the driver and thus can induce the driver to feel weird. Therefore, it is assumed to be particularly effective to prevent habituation to temperature stimuli.

Figure 20:
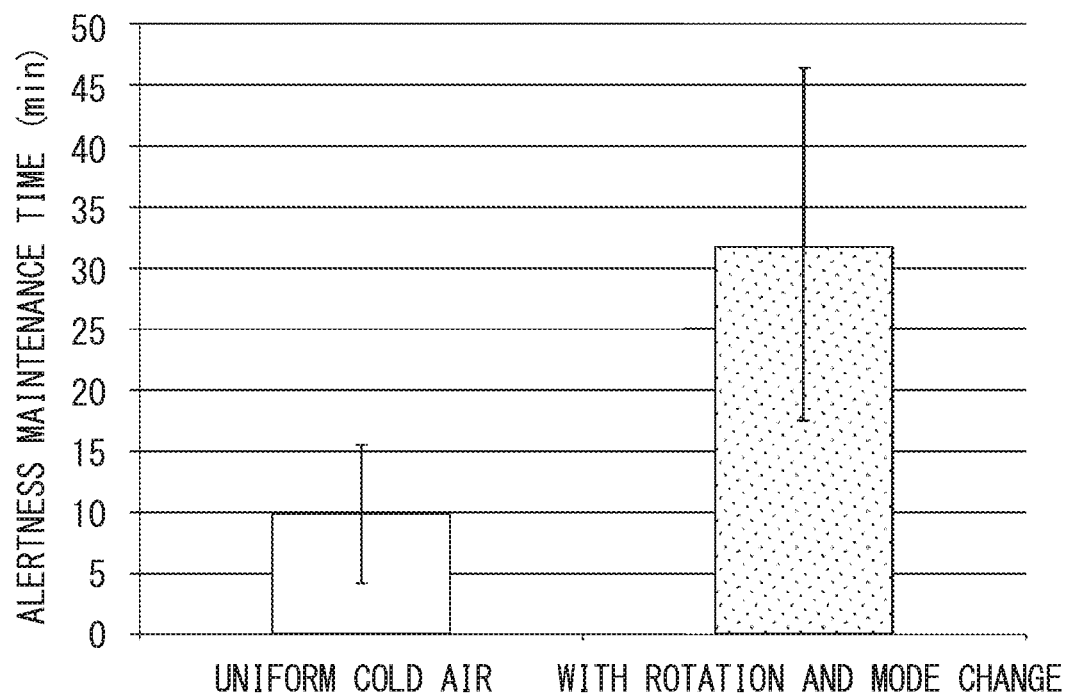
FIG. 20 is a diagram for explaining the alerting effect achieved by changing the mode of rotation while rotating the intensities of multiple types of temperature stimuli.

One example is given in FIG. 20 that shows the alerting effect achieved by changing the mode of rotation of the intensities of multiple types of temperature stimuli. FIG. 20 is a diagram showing a comparison between the alertness maintenance time when a temperature stimulus was given by a uniform stream of cold air, and the alertness maintenance time when the mode of rotation of the intensities of multiple types of temperature stimuli was changed. Ten and several test subjects were made to continue driving in a driving simulator, with temperature stimulus being started when the drowsiness level 2 was reached. FIG. 20 shows examples of average values of measurement results of the alertness maintenance time during which a state with less than the drowsiness level 2 was maintained, from a time point when the drowsiness level dropped to below level 2.

FIG. 20 shows an example of the results of an experiment carried out under the same conditions as the example of FIG. 19 except that the mode of rotation was changed when the time elapsed from the start of rotation reached the prescribed time mentioned above. The example of FIG. 20 shows the results of a case where the mode of rotation was changed such that the intensities of temperature stimuli were changed from low to high as shown in FIG. 8. The rotation with a higher intensity of temperature stimuli was performed with the temperature of the cold air being lowered by about 10° C. and the amount of air being increased by about 1 to 1.5 m/s as compared to the rotation with a lower intensity of temperature stimuli. More specifically, as compared to the rotation with a lower intensity of temperature stimuli, the rotation with a higher intensity of temperature stimuli was performed such that the amount of cold air to a target region in one cycle of rotation for which the temperature stimulus was to be intensified was increased by about 1.5 m/s, while the amount of cold air to a target region in one cycle of rotation for which the temperature stimulus was to be weakened was increased by about 1 m/s. FIG. 20 shows one example where the process of the flowchart of FIG. 16 was executed without the steps S5, S7, and S8.

As shown in FIG. 20, as compared to the alertness maintenance time when the temperature stimulus is given by a uniform stream of cold air, the alertness maintenance time is nearly three times longer when, while the intensities of multiple types of temperature stimuli are increased in rotation, the mode of rotation is also changed, i.e., a very high alerting effect is achieved. The alertness maintenance time is nearly 1.5 times longer than the configuration shown in FIG. 19 in which the mode of rotation is not changed, i.e., the achieved alerting effect is even higher. In a case where the mode of rotation is changed such that the intensities of temperature stimuli are changed from low to high as shown in FIG. 9, the results show similar tendencies.

According to the configuration of the first embodiment, the temperature stimuli are generated when the start trigger detector 201 detects a start trigger. Therefore, as compared to a configuration where temperature stimuli are continuously generated, the driver is given the temperature stimuli less often, so that the driver is less likely to become habituated to the temperature stimuli. According to the configuration of the present embodiment, a shift of the automation level of the automated driving to a level in which the driver must be watchful is detected by the start trigger detector 201 as the start trigger. Therefore, even when the alertness level of the driver has diminished due to the lighter burden of monitoring and driving operations during the automated driving, the driver can be alerted when the automation level is lowered and the driver needs to perform monitoring and driving operations.

Second Embodiment

The system is not limited to the configuration shown in the first embodiment. In an alternative configuration (that is, a second embodiment), the fluctuations may be attenuated and amplified in accordance with the intensities of the temperature stimuli changed in rotation by the rotation controller 204. The configuration of the second embodiment will be described below.

The drive assist system 1 of the second embodiment is similar to the drive assist system 1 of the first embodiment except that the stimulation controller 203 of the HCU 20 includes a fluctuation controller 209a instead of the fluctuation controller 209. An overview of the configuration of the fluctuation controller 209a will be described with reference to FIG. 21.

Figure 21:
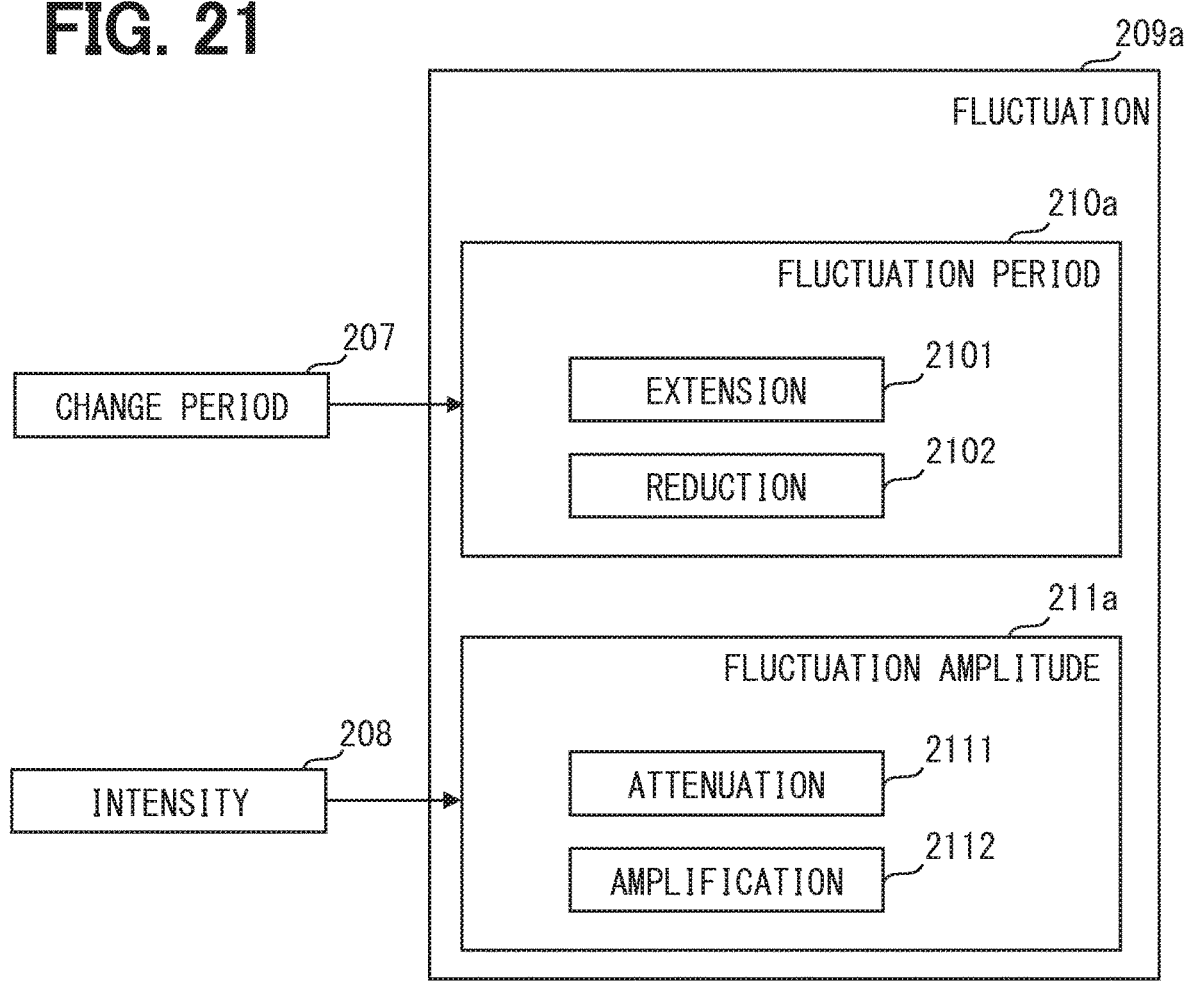
FIG. 21 is a diagram illustrating one example of a schematic configuration of the fluctuation controller.

As shown in FIG. 21, the fluctuation controller 209a includes a fluctuation period controller 210a and a fluctuation amplitude controller 211a. Except that the fluctuation period controller 210a and fluctuation amplitude controller 211a attenuate and amplify fluctuations in accordance with the intensities of the temperature stimuli changed by the rotation controller 204, they are similar to the fluctuation period controller 210 and fluctuation amplitude controller 211 of the first embodiment. Below, this configuration regarding the attenuation and amplification of fluctuations performed by the fluctuation period controller 210a and fluctuation amplitude controller 211a, which are different from the fluctuation period controller 210 and fluctuation amplitude controller 211 of the first embodiment, will be described.

First, as shown in FIG. 21, the fluctuation period controller 210a includes a fluctuation period extension portion 2101 and a fluctuation period reduction portion 2102. When the rotation controller 204 changes the intensities of the temperature stimuli to lower ones for the rotation, the fluctuation period extension portion 2101 switches the fluctuation period to be longer than the one prior to this change. With the fluctuation period being switched to be longer, the fluctuations become less noticeable for the driver, so that the driver can more readily recognize the change in the intensity of the temperature stimuli. When the rotation controller 204 changes the intensities of the temperature stimuli to higher ones for the rotation, the fluctuation period reduction portion 2102 switches the fluctuation period to be shorter than the one prior to this change. With the fluctuation period being switched to be shorter, the driver can more readily recognize the change in the intensity of the temperature stimuli. Preferably, in switching the fluctuation period, the fluctuation period controller 210a switches the fluctuation period to a shorter one than the change period that is being controlled by the change period controller 207.

As shown in FIG. 21, the fluctuation amplitude controller 211a includes a fluctuation attenuation portion 2111 and a fluctuation amplification portion 2112. When the rotation controller 204 changes the intensities of the temperature stimuli to lower ones for the rotation, the fluctuation attenuation portion 2111 switches the fluctuation amplitude to be smaller than the one prior to this change. With the fluctuation amplitude being switched to be smaller, the fluctuations become less noticeable for the driver, so that the driver can more readily recognize the change in the intensity of the temperature stimuli. When the rotation controller 204 changes the intensities of the temperature stimuli to higher ones for the rotation, the fluctuation amplification portion 2112 switches the fluctuation amplitude to be larger than the one prior to this change. With the fluctuation amplitude being switched to be larger, the driver can more readily recognize the change in the intensity of the temperature stimuli. Preferably, in switching the fluctuation amplitude, the fluctuation amplitude controller 211a switches the fluctuation amplitude to a smaller one than the difference between changed intensities that is being controlled by the intensity controller 208.

Figure 22:
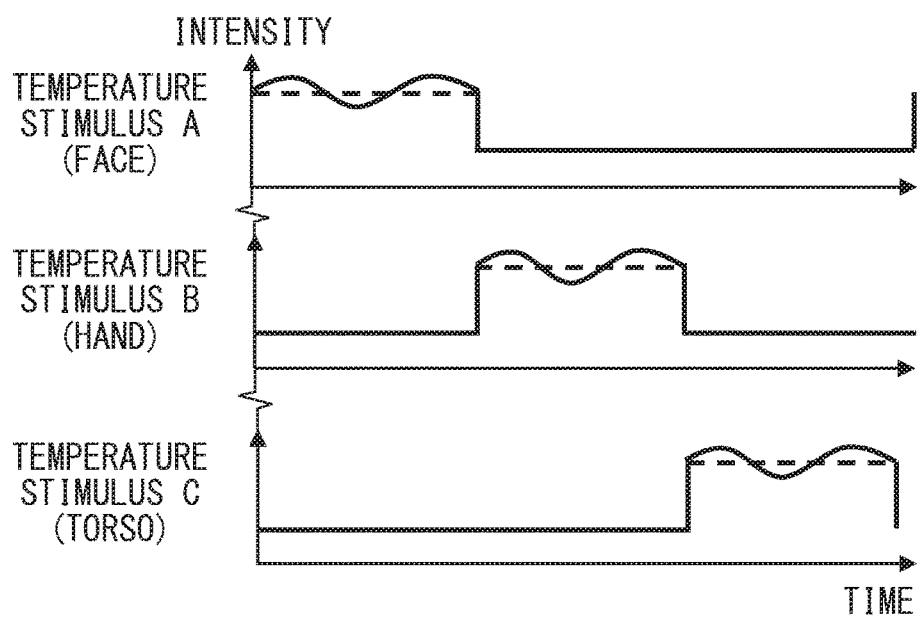
FIG. 22 is a diagram for explaining one example of control for attenuating fluctuations carried out by the fluctuation controller.
Figure 23:
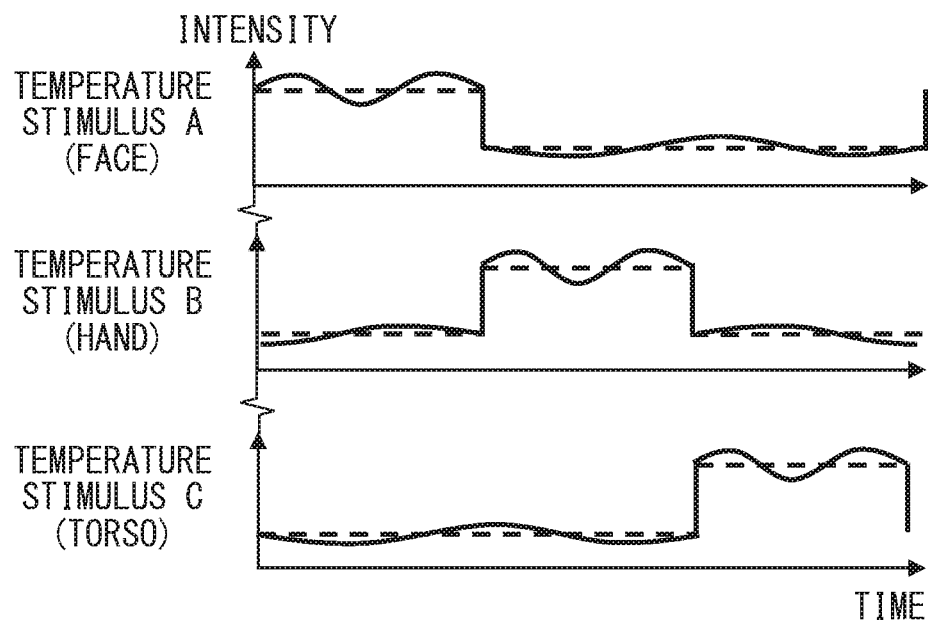
FIG. 23 is a diagram for explaining one example of control for attenuating fluctuations carried out by the fluctuation controller.
Figure 24:
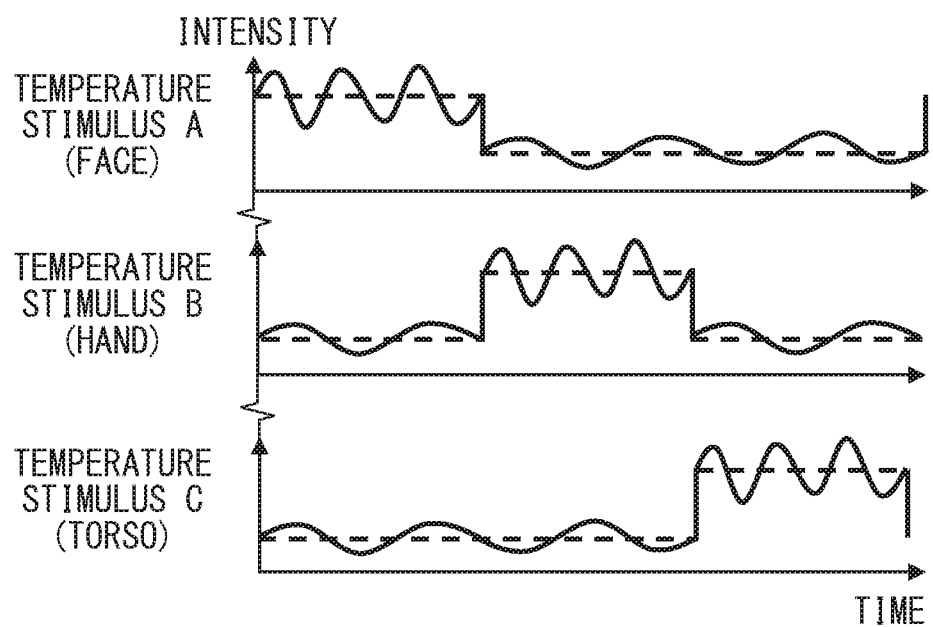
FIG. 24 is a diagram for explaining one example of control for amplifying the fluctuations carried out by the fluctuation controller.

When the rotation controller 204 changes the intensities of the temperature stimuli to lower ones for the rotation, the fluctuation amplitude controller 211a may stop the fluctuation itself as shown in FIG. 22 so that the change in the intensity of the temperature stimuli is more recognizable for the driver. Also, when the rotation controller 204 changes the intensities of the temperature stimuli to lower ones for the rotation, the fluctuation controller 209a may switch the fluctuation period to a longer one and switch the fluctuation amplitude to be a smaller one as shown in FIG. 23 so that the change in the intensity of the temperature stimuli is more recognizable for the driver. Also, when the rotation controller 204 changes the intensities of the temperature stimuli to higher ones for the rotation, the fluctuation controller 209a may switch the fluctuation period to a shorter one and switch the fluctuation amplitude to be a larger one as shown in FIG. 24 so that the change in the intensity of the temperature stimuli is more recognizable for the driver.

Figure 25:
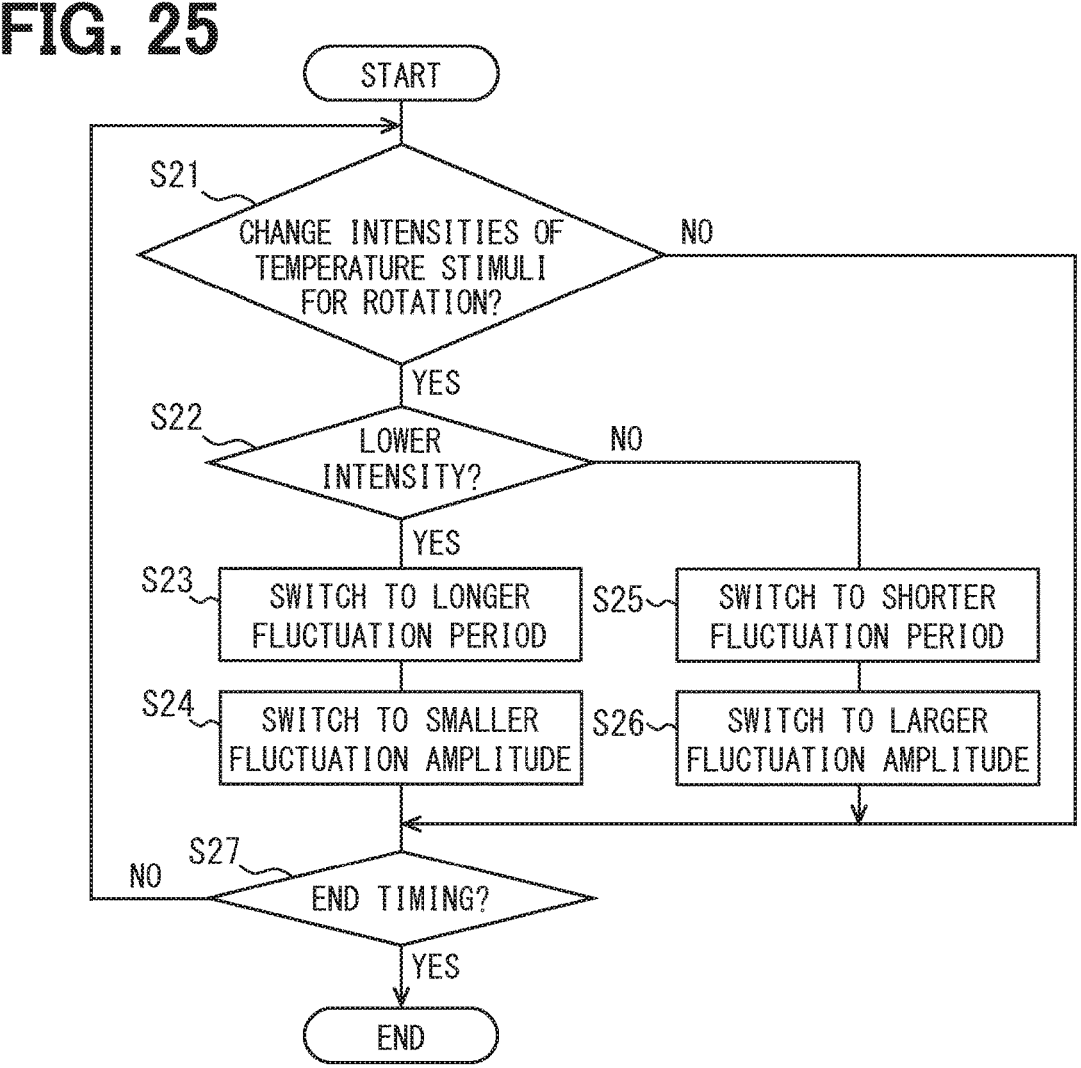
FIG. 25 is a flowchart showing one example of a flow of a rotation emphasis-related process carried out by the fluctuation controller.

Now, referring to FIG. 25, one example is described of a flow of the process related to attenuation and amplification of the fluctuations (also referred to as a rotation emphasis-related process) performed by the fluctuation controller 209a in accordance with the intensities of the temperature stimuli changed in rotation by the rotation controller 204. In the example described with reference to FIG. 25, when the rotation controller 204 changes the intensities of the temperature stimuli to lower ones for the rotation, the fluctuation period is switched to a longer one and the fluctuation amplitude is switched to a smaller one, while, when the rotation controller 204 changes the intensities of the temperature stimuli to higher ones for the rotation, the fluctuation period is switched to a shorter one and the fluctuation amplitude is switched to a larger one.

In a possible configuration, the flowchart of FIG. 25 may be started when the rotating feature is added to the temperature stimuli generated by the air conditioner 5 during the alerting stimulus-related process performed by the HCU 20. In a possible configuration, the rotation emphasis-related process may be carried out for each of multiple types of temperature stimuli generated by the air conditioner 5.

First, at S21, if the intensities of the temperature stimuli are to be changed by the rotation controller 204 (YES at S21), the process goes to S22. If the intensities of the temperature stimuli are not to be changed for the rotation by the rotation controller 204 (NO at S21), the process goes to S27. At S22, if the change in the intensity of the temperature stimuli for the rotation is a change for making the intensity lower (YES at S22), the process goes to S23. If the change in the intensity of the temperature stimuli for the rotation is a change for making the intensity higher (NO at S22), the process goes to S25.

At S23, the fluctuation period extension portion 2101 switches the fluctuation period to a longer one than that prior to the change in intensity of the temperature stimulus, with respect to the temperature stimulus that is to be weakened for the rotation. At S24, the fluctuation attenuation portion 2111 switches the fluctuation amplitude to a smaller one than that prior to the change in intensity of the alerting stimulus, with respect to the temperature stimulus that is to be weakened for the rotation, and the process goes to S27.

At S25, the fluctuation period reduction portion 2102 switches the fluctuation period to a shorter one than that prior to the change in intensity of the temperature stimulus, with respect to the temperature stimulus that is to be intensified for the rotation. At S26, the fluctuation amplification portion 2112 switches the fluctuation amplitude to a larger one than that prior to the change in intensity of the alerting stimulus, with respect to the temperature stimulus that is to be intensified for the rotation, and the process goes to S27.

At S27, if it is an end timing of the rotation emphasis-related process (YES at S27), the rotation emphasis-related process terminates. If it is not the end timing of the rotation emphasis-related process (NO at S27), the process goes back to S21 and repeats itself. One example of the end timing of the rotation emphasis-related process is termination of the alerting stimulus-related process performed by the HCU 20.

With the configuration described above, in addition to the effects achieved by the configuration of the first embodiment, while fluctuations are added to the temperature stimuli, any changes in the intensities of the temperature stimuli can effectively be made more recognizable for the driver. More specifically, fluctuations are attenuated when the intensity of the temperature stimuli is lowered, while the fluctuations are amplified when the intensity of the temperature stimuli is raised, to draw more attention to the temperature stimuli intensified in rotation, so that the driver can more readily recognize the temperature stimuli intensified in rotation. Therefore, the rotation and fluctuations of temperature stimuli, which are two features supposed to prevent habituation of the temperature stimuli, are expected to be both highly effective, so that the alertness level of the driver can be maintained high.

While one configuration where the fluctuations are attenuated and amplified is shown here, the system is not limited to this configuration. For example, in an alternative configuration, the fluctuations may be either attenuated or amplified, to make the temperature stimuli intensified in rotation more recognizable for the driver. While one configuration where the fluctuations are attenuated and amplified by the switching of the fluctuation period and fluctuation amplitude is shown here, the system is not limited to this configuration. For example, in an alternative configuration, the fluctuation may be attenuated and amplified by the switching of either one of the fluctuation period and fluctuation amplitude.

In a configuration where only one of the fluctuation period and fluctuation amplitude is to be switched, it may be preferable to switch the fluctuation amplitude, because the driver will more likely to notice the change in the intensity of the temperature stimuli if the fluctuation amplitude is switched. When attenuating the fluctuations, it is more preferable to stop the fluctuations all together, because the driver will more likely to notice the changes in the intensities of the temperature stimuli if the fluctuation itself is stopped.

Third Embodiment

In an alternative configuration, the rotation controller 204 may change the intensity of the temperature stimulus to the torso of the driver, of multiple types of temperature stimuli generated by the air conditioner 5, to be constantly high while rotating the temperature stimuli to other parts than the torso of the driver, when the change trigger detector 202 detects the change trigger.

The temperature stimulus intensity control carried out by the rotation controller 204 in a third embodiment will now be described with reference to FIG. 26. One example will be described with reference to FIG. 26 where there are three types of temperature stimuli, i.e., a temperature stimulus to the face A, a temperature stimulus to the hands B, and a temperature stimulus to the torso C. The vertical axis of the graphs in FIG. 26 represents intensity, while the horizontal axis represents time.

The rotation controller 204 sequentially increase the intensities of the temperature stimulus to the face A, temperature stimulus to the hands B, and temperature stimulus to the torso C in rotation until the change trigger detector 202 detects the change trigger. When the change trigger detector 202 detects the change trigger, the rotation controller 204 changes the intensity of the temperature stimulus to the torso C to be constantly high to stop it from being part of the rotation, as shown in FIG. 26. Since the alerting effect is increased when the entire torso of the driver is cooled, the constant intensification of the temperature stimulus to the torso with cold air can further enhance the alerting effect.

Figure 26:
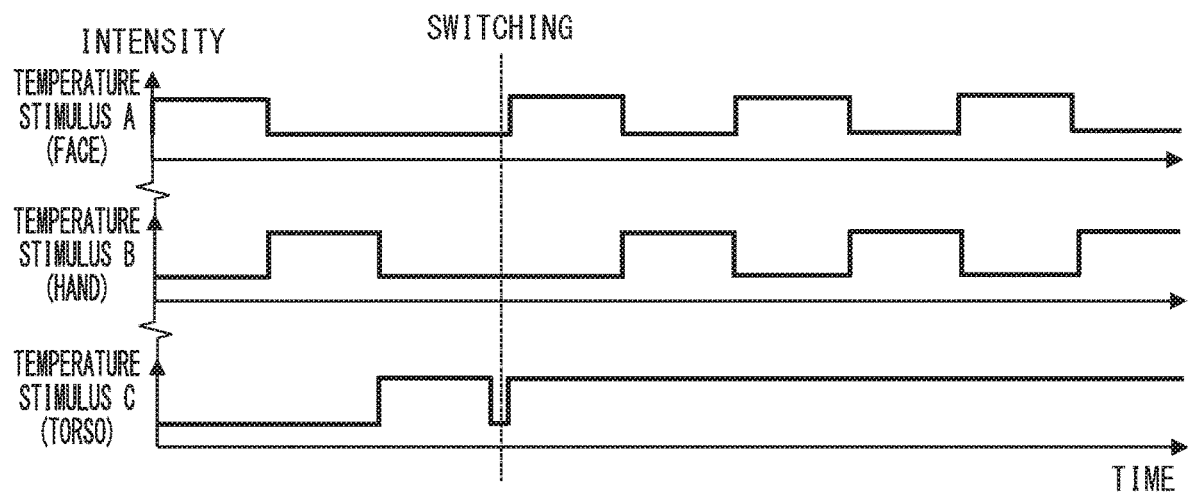
FIG. 26 is a diagram for explaining one example of temperature stimulus intensity control carried out by the rotation controller.

The rotation controller 204 may stop the temperature stimulus to the torso C from being part of the rotation as shown in FIG. 26 and increase the intensities of the temperature stimulus to the face A and temperature stimulus to the hands B in turn. In a possible configuration, the change in the intensity of the temperature stimulus to the torso to be constantly high may be carried out by the change period controller 207 of the rotation controller 204. In a possible configuration, the temperature stimulus to the torso C may be stopped from being part of the rotation by the sequence controller 205 of the rotation controller 204.

A higher alerting effect can be obtained with the configuration of the third embodiment, because the temperature stimulus for maintaining an alert state of the driver is given to the torso, which is a body part with a particularly high sensitivity to a temperature stimulus. Also, with the configuration of the third embodiment, habituation of temperature stimuli is unlikely, because the mode of generation of the temperature stimuli generated by the air conditioner 5 is changed when the change trigger is detected in situations where temperature stimuli are being generated.

Fourth Embodiment

While one configuration where temperature stimuli are given to the driver by an air flow generated by the air conditioner 5 is shown in the embodiments described above, the system is not limited to this configuration. For example, in an alternative configuration, a temperature stimulus may be given to the driver by other means than the air flow generated by the air conditioner 5, such as by using a Peltier device or the like. For example, in an alternative configuration, a temperature stimulus may be given to the torso by a Peltier device provided in the driver's seat, or a temperature stimulus may be given to the hands by a Peltier device provided in the steering wheel.

Fifth Embodiment

While one configuration where multiple types of temperature stimuli generated by the air conditioner 5 include a temperature stimulus to the torso is shown in the embodiments described above, the system is not limited to this configuration. For example, in an alternative configuration, the multiple types of temperature stimuli generated by the air conditioner 5 do not have to include a temperature stimulus to the torso.

Sixth Embodiment

While one configuration where the rotation controller 204 switches the sequence, rapidity of change in the intensity, change period, and upper and/or lower intensity limits when the intensities of the temperature stimuli are increased in rotation is shown in the embodiments described above, the system is not limited to this configuration. For example, in an alternative configuration, only some of the sequence, rapidity of change in the intensity, change period, and upper and/or lower intensity limits may be switched when the intensities of the temperature stimuli are increased in rotation.

Seventh Embodiment

While one configuration where the fluctuation controller 209 changes the fluctuation period and fluctuation amplitude when the intensity of the temperature stimulus is fluctuated is shown in the embodiments described above, the system is not limited to this configuration. For example, in an alternative configuration, only one of the fluctuation period and the fluctuation amplitude may be changed when the intensity of the temperature stimulus is fluctuated.

Eighth Embodiment

While one configuration where the stimulation controller 203 includes the rotation controller 204 and fluctuation controller 209 is shown in the embodiments described above, the system is not limited to this configuration. For example, in an alternative configuration, the stimulation controller 203 does not have to include the fluctuation controller 209.

Ninth Embodiment

While one configuration is shown in the embodiments described above where the start trigger detected by the start trigger detector 201 is one of the drowsiness detected by the DSM 21 reaching or exceeding a threshold, reception of an operation of the stimulus request switch, and a change of the automation level of the automated driving to a level in which the driver must be watchful, the system is not limited to this configuration. For example, in an alternative configuration, only some of the features listed above may be detected as the start trigger. Alternatively, it may be detected as the start trigger that a voice command from the driver requesting generation of an alerting stimulus is recognized by a voice recognition device.

Tenth Embodiment

While one configuration where multiple types of temperature stimuli are generated by the air conditioner 5 simultaneously is shown in the embodiments described above, the system is not limited to this configuration. For example, in an alternative configuration, the intensity of some of the multiple types of temperature stimuli generated by the air conditioner 5 may be dropped to zero at some point. Namely, both configurations are possible, where at least some of the multiple types of temperature stimuli generated by the air conditioner 5 are provided simultaneously, and where all of the multiple types of temperature stimuli are generated by the air conditioner 5 at different times in turn.

Eleventh Embodiment

As one example of alerting stimulus, temperature stimuli are described in the foregoing embodiments, but the stimulus is not limited to the temperature stimulus. In a possible configuration, light, sound, vibration, and the like may be used in addition to the temperature stimulus as the alerting stimulus. In a configuration that uses light, an LED, or the like of the display device 22 may emit light of a wavelength that is expected to provide an alerting effect. In a configuration that uses sound, a speaker, a buzzer, and the like of the audio output device 23 may output an alarm or a buzzing sound. In a configuration that uses vibration, a vibrator installed at a point which the driver of the subject vehicle will touch, for example, such as a steering wheel and the driver's seat, may be vibrated.

Twelfth Embodiment

While one configuration where the DSM 21 is used to detect the driver's level of drowsiness is shown in the embodiments described above, the system is not limited to this configuration. For example, in an alternative configuration, the driver's level of drowsiness may be detected from the measurement results obtained by a measurement device that measures the driver's biological information. The HCU 20, for example, may be configured to detect the driver's level of drowsiness from the measurement results obtained by the measurement device.

Examples of measurement devices and measurement results used for the detection of the level of drowsiness include brain waves measured by an electroencephalograph, heart rates and heart rate fluctuations measured by a heart rate meter, pulse waves measured by a sphygmograph, skin conductance measured by an electrodermal activity meter, and the like. Any known methods may be used for detecting the level of drowsiness from measurement results. The measurement device may be a wearable device attached on the driver to collect biological information, or a device mounted to a steering wheel or the like of the vehicle.

In another possible configuration, the driver's level of drowsiness may be detected from the information obtained by an in-vehicle sensor installed in the subject vehicle. The HCU 20, for example, may be configured to detect the level of drowsiness from the information obtained by a sensor installed in the subject vehicle. Examples of in-vehicle sensors and information used for the detection of the level of drowsiness include steering angles detected by a steering angle sensor, traffic lane markings detected by the peripheral monitoring camera, and the like. Any known methods may be used for detecting the level of drowsiness from the information obtained by an in-vehicle sensor. For example, the level of drowsiness may be detected from swaying of the subject vehicle that is determined from the position of traffic lane markings that are sequentially detected by the peripheral monitoring camera, or, the level of drowsiness may be detected from an amount of variation in the steering operation determined from the steering angles sequentially detected by the steering sensor.

Thirteenth Embodiment

While one configuration where the drive assist system 1 is used for an automobile is shown in the embodiments described above, the system is not limited to this application. The drive assist system 1 can be used in various moving bodies and may be configured, for example, to be used in vehicles other than automobiles, such as railway vehicles and motorized bicycles, or configured to be used in moving bodies other than vehicles such as airplanes and ships. The system may also be configured to be used indoors instead of moving bodies, such as residential buildings and institutions. In this case, the target person whose alertness is to be maintained indoors corresponds to the subject person.

It is noted that a flowchart or the processing of the flowchart in the present application includes multiple steps (also referred to as sections), each of which is represented, for instance, as S1. Further, each step can be divided into several sub-steps while several steps can be combined into a single step.

It should be noted that the present disclosure is not limited to the above-described embodiments, and various modifications are possible within the scope shown in the disclosures, and can be obtained by appropriately combining technical means disclosed in different embodiments. Embodiments are also included in the technical scope of the present disclosure.

What is claimed is:

1. An alertness maintenance apparatus comprising:
    a stimulation controller that is configured to cause a stimulation device to generate multiple types of temperature stimuli maintaining an alert state of a subject person, the temperature stimuli including a temperature stimulus to a hand of the subject person and also including a temperature stimulus to a face of the subject person or a temperature stimulus to a torso of the subject person via a seat on which the subject person sits,
    wherein:
    the stimulation controller includes a rotation controller that is configured to change intensities of the multiple types of temperature stimuli generated to sequentially increase the intensities of the temperature stimuli in rotation; and
    the stimulation controller causes the stimulation device to simultaneously generate the multiple types of the temperature stimuli.

2. The alertness maintenance apparatus according to claim 1, further comprising:
    a trigger detector that is configured to detect a trigger in a situation where the stimulation controller generates the temperature stimuli, the trigger being at least one of a level of drowsiness of the subject person detected using a drowsiness detection device used for detecting the level of drowsiness reaching or exceeding a predetermined threshold or an elapse of a prescribed time after the stimulation device starts generating the temperature stimuli,
    wherein:
    the rotation controller changes a mode of generation of the temperature stimuli generated, in response to that the trigger detector detects the trigger.

3. The alertness maintenance apparatus according to claim 2, wherein:
    the multiple types of temperature stimuli generated by the stimulation device includes the temperature stimulus to the face of the subject person and the temperature stimulus to the hands of the subject person;
    the stimulation controller causes the stimulation device to generate the temperature stimuli;
    the rotation controller includes a sequence controller that shifts a sequence of intensity changes of the temperature stimuli when the intensities of the multiple types of temperature stimuli generated are changed to sequentially increase in rotation; and
    the sequence controller shifts the sequence to increase a rate at which the temperature stimulus to the face is intensified in response to that the trigger detector detects the trigger.

4. The alertness maintenance apparatus according to claim 2, wherein:
    the rotation controller includes a rapidity controller that changes rapidity of changes in intensity when the intensities of the multiple types of the temperature stimuli generated are changed to sequentially increase the intensities in rotation; and the rapidity controller switches the rapidity of changes in the intensity to enlarge the rapidity in response to that the trigger detector detects the trigger.

5. The alertness maintenance apparatus according to claim 2, wherein:
the multiple types of temperature stimuli generated by the stimulation device include the temperature stimulus to the face of the subject person and the temperature stimulus to the hands of the subject person;
the stimulation controller causes the stimulation device to generate the temperature stimuli;
the rotation controller includes a change period controller that changes periods of a change in rotation when the intensities of the multiple types of temperature stimuli generated by the stimulation device are changed to sequentially increase the intensities in the rotation; and
the change period controller changes the periods of the change such that a period of time in which the intensity of the temperature stimulus to the face is continuously increased is prolonged in the rotation in response to that the trigger detector detects the trigger.

6. The alertness maintenance apparatus according to claim 2, wherein:
the rotation controller includes an intensity controller that changes a difference between an upper limit and a lower limit of intensity of each temperature stimulus when the intensities of the multiple types of the temperature stimuli generated by the stimulation device are changed to sequentially increase the intensities in rotation; and
the intensity controller makes the difference between the upper limit and the lower limit of the intensity enlarge for each of the temperature stimuli in response to that the trigger detector detects the trigger.

7. The alertness maintenance apparatus according to claim 2, wherein:
the rotation controller includes an intensity controller that changes intensity of each temperature stimulus while a difference between an upper limit and a lower limit of the intensity is unchanged when the intensities of the multiple types of the temperature stimuli generated by the stimulation device are changed to sequentially increase in rotation; and
the intensity controller increases the intensity of each temperature stimulus in response to that the trigger detector detects the trigger.

8. An alertness maintenance apparatus comprising:
a stimulation controller that is configured to cause a stimulation device to generate multiple types of temperature stimuli maintaining an alert state of a subject person, the temperature stimuli including a temperature stimulus to a hand of the subject person and also including a temperature stimulus to a face of the subject person or a temperature stimulus to a torso of the subject person via a seat on which the subject person sits; and
a trigger detector that is configured to detect a trigger in a situation where the stimulation controller generates the temperature stimuli, the trigger being at least one of a level of drowsiness of the subject person detected using a drowsiness detection device used for detecting the level of drowsiness reaching or exceeding a predetermined threshold or an elapse of a prescribed time after the stimulation device starts generating the temperature stimuli, wherein:
the stimulation controller includes a rotation controller that is configured to change intensities of the multiple types of temperature stimuli generated to sequentially increase the intensities of the temperature stimuli in rotation;
the rotation controller changes a mode of generation of the temperature stimuli generated, in response to that the trigger detector detects the trigger; and
in response to that the level of drowsiness detected by the drowsiness detection device falls below the threshold, the rotation controller returns the mode of the generation of the temperature stimuli changed due to detection of the trigger by the trigger detector back to the mode of generation before the detection of the trigger.

9. The alertness maintenance apparatus according to claim 8, wherein:
the multiple types of temperature stimuli for maintaining the alert state of the subject person generated by the stimulation device include the temperature stimulus to the face of the subject person, the temperature stimulus to the hands of the subject person, and the temperature stimulus to the torso of the subject person via the seat on which the subject person sits;
the stimulation controller causes the stimulation device to generate the temperature stimuli; and
in response to that the trigger detector detects the trigger, the rotation controller changes the intensity of the temperature stimulus to the torso of the subject person, of the multiple types of the temperature stimuli, to be constantly high, and also changes the intensities of the temperature stimuli other than the temperature stimulus to the torso of the subject person in rotation.

10. The alertness maintenance apparatus according to claim 9, wherein:
the stimulation controller causes the stimulation device to simultaneously generate the multiple types of the temperature stimuli.

11. The alertness maintenance apparatus according to claim 8, wherein:
the stimulation controller includes a fluctuation controller that changes intensities of the temperature stimuli to generate fluctuations in each of the intensities of the multiple types of the temperature stimuli generated by the stimulation device; and
the fluctuation controller changes a mode of generation of the temperature stimuli generated by the stimulation device in response to that the trigger detector detects the trigger.

12. The alertness maintenance apparatus according to claim 11, wherein:
in response to that the level of drowsiness detected by the drowsiness detection device falls below the threshold, the fluctuation controller returns the mode of the generation of the temperature stimuli changed due to detection of the trigger by the trigger detector back to the mode of the generation before the detection of the trigger.

13. The alertness maintenance apparatus according to claim 11, wherein:
the fluctuation controller includes a fluctuation period controller that changes periods of the fluctuations when the intensities of the temperature stimuli are changed to generate the fluctuations in each of the intensities of the multiple types of the temperature stimuli generated by the stimulation device; and the fluctuation period controller reduces the periods of the fluctuations in response to the trigger detector detects the trigger.

14. The alertness maintenance apparatus according to claim 11, wherein:
the fluctuation controller includes a fluctuation amplitude controller that changes fluctuation amplitudes of the intensities of the temperature stimuli when the intensities of the temperature stimuli are changed to generate the fluctuations in each of the intensities of the multiple types of the temperature stimuli generated by the stimulation device; and
the fluctuation amplitude controller increases the fluctuation amplitudes in response to that the trigger detector detects the trigger.

15. An alertness maintenance apparatus comprising:
a stimulation controller that is configured to cause a stimulation device to generate multiple types of temperature stimuli maintaining an alert state of a subject person, the temperature stimuli including a temperature stimulus to a hand of the subject person, a temperature stimulus to a face of the subject person, and a temperature stimulus to a torso of the subject person via a seat on which the subject person sits; and
a trigger detector that is configured to detect a trigger in a situation where the stimulation controller generates the temperature stimuli, the trigger being at least one of a level of drowsiness of the subject person detected using a drowsiness detection device used for detecting the level of drowsiness reaching or exceeding a predetermined threshold or an elapse of a prescribed time after the stimulation device starts generating the temperature stimuli,
wherein:
the stimulation controller includes a rotation controller that is configured to change intensities of the multiple types of temperature stimuli generated to sequentially increase the intensities of the temperature stimuli in rotation;
the stimulation controller causes the stimulation device to generate the multiple types of temperature stimuli;
the rotation controller changes a mode of generation of the temperature stimuli generated, in response to that the trigger detector detects the trigger;
in response to that the trigger detector detects the trigger, the rotation controller changes the intensity of the temperature stimulus to the torso of the subject person, of the multiple types of the temperature stimuli, to be constantly high, and also changes the intensities of the temperature stimuli other than the temperature stimulus to the torso of the subject person in rotation.

16. An alertness maintenance apparatus comprising:
a stimulation controller that is configured to cause a stimulation device to generate multiple types of temperature stimuli maintaining an alert state of a subject person, the temperature stimuli including a temperature stimulus to a hand of the subject person and also including a temperature stimulus to a face of the subject person or a temperature stimulus to a torso of the subject person via a seat on which the subject person sits; and
a trigger detector that is configured to detect a trigger in a situation where the stimulation controller generates the temperature stimuli, the trigger being at least one of a level of drowsiness of the subject person detected using a drowsiness detection device used for detecting the level of drowsiness reaching or exceeding a predetermined threshold or an elapse of a prescribed time after the stimulation device starts generating the temperature stimuli,
wherein:
the stimulation controller includes a rotation controller that is configured to change intensities of the multiple types of temperature stimuli generated to sequentially increase the intensities of the temperature stimuli in rotation;
the stimulation controller includes a fluctuation controller that changes intensities of the temperature stimuli to generate fluctuations in each of the intensities of the multiple types of the temperature stimuli generated by the stimulation device;
the rotation controller changes a mode of generation of the temperature stimuli generated, in response to that the trigger detector detects the trigger;
the fluctuation controller changes a mode of generation of the temperature stimuli generated by the stimulation device in response to that the trigger detector detects the trigger; and
in response to that the level of drowsiness detected by the drowsiness detection device falls below the threshold, the fluctuation controller returns the mode of the generation of the temperature stimuli changed due to detection of the trigger by the trigger detector back to the mode of the generation before the detection of the trigger.

* * * * *